(12) United States Patent
Dalli et al.

(10) Patent No.: US 11,232,357 B2
(45) Date of Patent: Jan. 25, 2022

(54) METHOD FOR INJECTING HUMAN KNOWLEDGE INTO AI MODELS

(71) Applicant: UMNAI Limited, Ta' Xbiex (MT)

(72) Inventors: Angelo Dalli, Floriana (MT); Mauro Pirrone, Kalkara (MT)

(73) Assignee: UMNAI Limited, Ta' Xbiex (MT)

( * ) Notice: Subject to any disclaimer, the term of this patent is extended or adjusted under 35 U.S.C. 154(b) by 0 days.

(21) Appl. No.: 17/174,528

(22) Filed: Feb. 12, 2021

(65) Prior Publication Data

US 2021/0256377 A1  Aug. 19, 2021

Related U.S. Application Data

(60) Provisional application No. 62/975,937, filed on Feb. 13, 2020.

(51) Int. Cl.
*G06N 3/08* (2006.01)
*G06N 20/00* (2019.01)
*G06N 3/04* (2006.01)

(52) U.S. Cl.
CPC .............. *G06N 3/08* (2013.01); *G06N 20/00* (2019.01); *G06N 3/0454* (2013.01)

(58) Field of Classification Search
CPC ............................... G06N 3/08; G06N 3/0454
See application file for complete search history.

(56) References Cited

U.S. PATENT DOCUMENTS

2021/0133610 A1*  5/2021  Ramamurthy ......... G06N 5/045

OTHER PUBLICATIONS

Gunning, David; Explainable Artificial Intelligence (XAI); DARPA; 2017; pp. 1-18. (Year: 2017).*
Choo, Jaegul et al.; Visual Analytics for Explainable Deep Learning; 2018; IEEE Computer Society; IEEE Computer Graphics and Applications Jul./Aug.; pp. 84-92. (Year: 2018).*
Gunning, David et al.; DARPA's Explainable Artificial Intelligence Program; 2019; AI Magazine; Deep Learning and Security; pp. 44-58. (Year: 2019).*

(Continued)

*Primary Examiner* — Stanley K. Hill
(74) *Attorney, Agent, or Firm* — Maier & Maier, PLLC

(57) ABSTRACT

Human knowledge may be injected in an explainable AI system in order to improve the model's generalization error, model accuracy, interpretability of the model, avoid or eliminate bias, while providing a path towards the integration of connectionist systems with symbolic logic in a combined AI system. Human knowledge injection may be implemented by harnessing the white-box nature of explainable/interpretable models. In one exemplary embodiment, a user applies intuition to model-specific cases or exceptions. In another embodiment, an explainable model may be embedded in workflow systems which enable users to apply pre-hoc and post-hoc operations. A third exemplary embodiment implements human-assisted focusing. An exemplary embodiment also presents a method to train and refine explainable or interpretable models without losing the injected knowledge defined by humans when applying gradient descent techniques. The white-box nature of explainable models allows for precise source attribution and traceability of knowledge incorporated into the model.

29 Claims, 14 Drawing Sheets

High Level Induction Process

(56) References Cited

OTHER PUBLICATIONS

Kursuncu, Ugur et al.; Knowledge Infused Learning (K-IL): Towards Deep Incorporation of Knowledge in Deep Learning; 2020; AAAI Spring Symposium on Combining Machine Learning and Knowledge Engineering in Practice; 10 pages. (Year: 2020).*

Confalonieri, Roberto et al.; A historical perspective of explainable Artificial Intelligence; 2020; WIREs Data Mining and Knowledge Discovery published by Wiley Periodicals LLC.; pp. 1-21. (Year: 2020).*

Islam, Sheikh Rabiul et al.; Explainable Artificial Intelligence Approaches: A Survey; 2021; arXiv:2101.09429v1 [cs.AI] Jan. 23, 2021; pp. 1-14. (Year: 2021).*

* cited by examiner

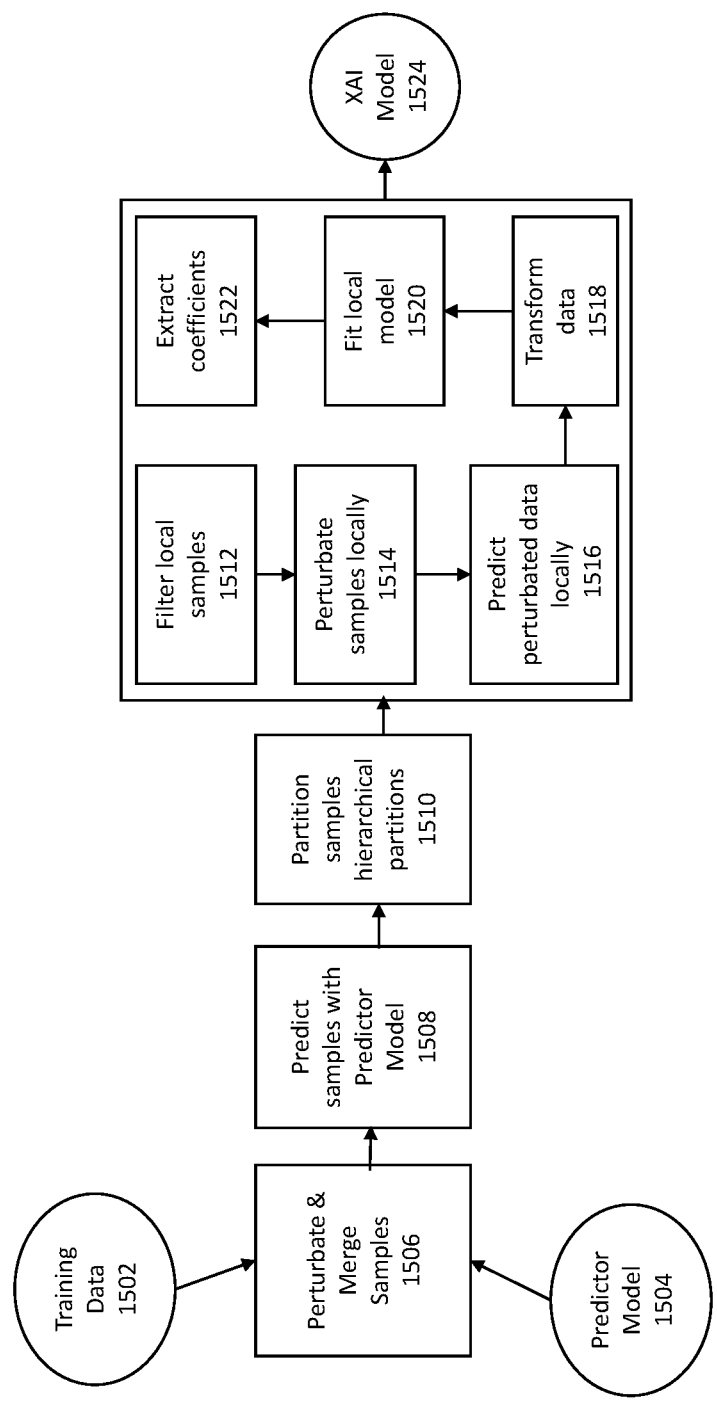
Figure 12 – Exemplary Induction Method

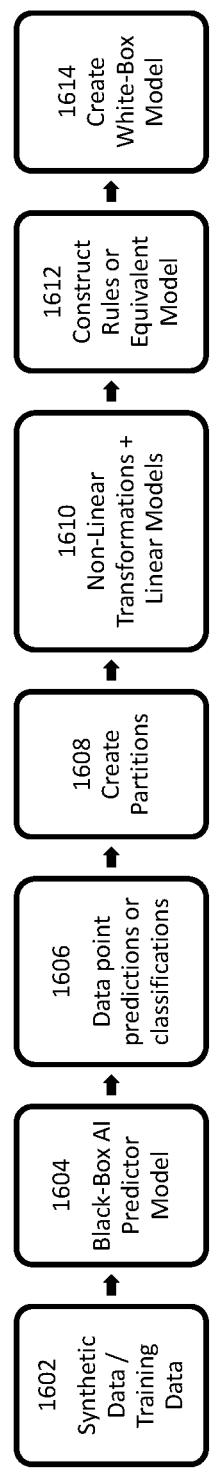
Figure 13 – High Level Induction Process

METHOD FOR INJECTING HUMAN KNOWLEDGE INTO AI MODELS

CROSS-REFERENCE TO RELATED APPLICATIONS

This application claims priority from U.S. Provisional Patent Application No. 62/975,937, filed on Feb. 13, 2020, entitled "METHOD FOR INJECTING HUMAN KNOWLEDGE INTO AI MODELS," the entire contents of which are hereby incorporated by reference.

FIELD

An exemplary embodiment presents a method for injecting human knowledge into artificial intelligence models.

BACKGROUND

Expert systems are one of the oldest forms of artificial intelligence (AI), where human experts encode knowledge in the form of rules in order to automate some form of decision making. The encoding process is extremely laborious as it requires specifying all the steps, the basis for each decision, and how to handle exceptions.

Over the years, expert systems have gone out of fashion due to their high complexity. Several machine learning (ML) techniques have been researched and invented in order to solve the problems and limitations behind expert systems. Unlike expert systems, machine learning systems learn by example, and it is the computer program that fits a model as a system of rules and/or equations. Such model is created by analyzing and extracting patterns within the data. Recent achievements in the field of machine learning have led to a tremendous number of new implementations of artificial intelligence, offering a multitude of benefits and advantages. AI algorithms outperform humans in new areas of application.

Workflow systems are similarly one of the most useful and commonly used systems that capture business logic, document processes, and enable automation of a wide variety of applications. Workflow systems suffer from similar disadvantages as expert systems with relation to modern AI techniques.

The recent advancements in ML and Deep Learning have, however, introduced new challenges. While models are achieving ground-breaking model performance, the inner structure of such models is extremely complex and is developed without human-specified rules, which makes this inner structure difficult to interpret.

Current expert systems and ML exist as two different approaches to AI. In the former method, the system's knowledge is expressly defined by humans, while in the latter approach, knowledge is extracted automatically by a computer system. Current machine learning techniques do not allow for human knowledge to be integrated into the system, which not only creates the above problems but creates other inefficiencies based on models not being able to benefit from existing knowledge.

SUMMARY

According to at least one exemplary embodiment, a method, system and apparatus for implementing human knowledge into an explainable neural network or artificial intelligence may be shown and described.

Human knowledge may be injected into an explainable AI system in order to improve the model's generalization error or model accuracy, improve the interpretability of the model, and avoid potentially undesirable biases and eliminate unintentional biases, while providing a path towards the integration of connectionist systems with symbolic logic in a combined AI system.

An exemplary embodiment may implement one of three variants or methods of human knowledge injection (HKI) into an explainable system. The first variant is applicable when the human user applies intuition to model specific cases or exceptions. The second variant is applicable when the human user applies pre-hoc and post-hoc operations on explainable systems. The third variant is applicable when the human user knows where to look or what to look for but does not know the exact answer. This approach is called human-assisted focusing.

The first method may operate via the integration of an expert system, whereby knowledge is represented in the form of rules, and human users can add or edit existing rules. Once rules are extended with an expert system, such knowledge may be converted back to an XAI model or XNN. Human-assisted focusing includes manually defining XAI/XNN partitions, without defining the local model for such partition.

Expert systems and workflow systems may be seen as a variant of the concept of a sequence of rules, process definitions, typed rules and output. All references to expert systems may also refer to workflow systems and the two terms may be implemented interchangeably.

An exemplary embodiment also presents a method for training and refining XAI/XNN models without losing the injected knowledge defined by humans when applying gradient descent techniques, such as back-propagation. The white-box nature of XAI models and XNNs allows for precise source attribution and traceability of knowledge incorporated into the model, increasing accountability and trustworthiness. Another exemplary embodiment may implement Explainable Transducers Transformers (XTTs) as an alternative to the XAI models and XNNs. All methods that may be explained as being applicable to or available for XNNs may have an available logical equivalent in their XTT counterparts. Likewise, all references to exemplary embodiments which implement XNNs thus may also cover XTTs. Thus, XNNs and XTTs may be implemented interchangeably.

An exemplary embodiment may be applied to most explainable or interpretable systems that allow for human knowledge to be incorporated within such systems. Examples of explainable or interpretable systems that may be used for the implementation of an exemplary embodiment include, but are not limited to, those based on induced eXplainable artificial intelligence (XAI) models, Interpretable Neural Nets (INNs), eXplainable Neural Nets (XNN), eXplainable Transducer Transformers (XTT), eXplainable Spiking Nets (XSN), eXplainable Memory Net (XMN), eXplainable Reinforcement Learning (XRL), eXplainable Generative Adversarial Network (XGAN), eXplainable AutoEncoders (XAE), eXplainable CNNs (CNN-XNN), Predictive eXplainable XNNs (PR-XNNs), Interpretable Neural Networks (INNs) and related grey-box models which may be a hybrid mix between a black-box and white-box model. Although some examples may reference one or more of these specifically (for example, only XRL or XNN), it may be contemplated that any of the embodiments described herein may be applied to XAIs, XNNs, XTTs, XSNs, INNs, XMNs, and the like interchangeably. An exemplary embodiment may apply fully to the white-box part of the grey-box model and may apply to at least some portion of the black-box part of the grey-box model. It may be contemplated that any of the embodiments described herein may also be applied to INNs interchangeably.

In a first aspect, the present disclosure provides a computer-implemented method of human knowledge injection into an explainable artificial intelligence (XAI) system, the method comprising: receiving one or more inputs to the XAI system, wherein said one or more inputs comprise a data representative of human knowledge in a universal knowledge representation format; identifying a plurality of partitions based on said one or more inputs according to a set of instruction rules, wherein the set of instruction rules is associated with a variant of the human knowledge injection into XAI system, and wherein the set of instruction rules are formed in relation to the plurality of partitions; updating the XAI system with said one or more inputs based on the variant of the human knowledge injection; and applying the data representative of the human knowledge to the configured XAI system as the human knowledge injection, wherein the human knowledge injection is driven by at least one criteria of the XAI system; and outputting from the XAI system in response to the human knowledge injection.

In a second aspect, the present disclosure provides a computer-implemented method for injecting knowledge into an explainable model embedded in a user-defined workflow, the method comprising: identifying a plurality of partitions, wherein each partition comprises a local model, and wherein the plurality of partitions form a global model, wherein the global model is linear or non-linear; forming a set of rules based on the one or more local models; representing the set of rules in a symbolic logic format; forming an explainable model with the set of rules and the one or more local models; receiving, from a user, a set of data corresponding to human knowledge; representing the set of data in the symbolic logic format, said representation comprising a localization trigger and an action; creating a new condition based on the localization trigger, wherein the explainable model is configured to execute the action upon detection of the new condition; receiving an input related to the human knowledge; inputting the input to the explainable model and receiving an output from the explainable model; receiving a localized explanation from the explainable model; summarizing the localized explanation and identifying relevant feature attributions; performing a control and quality check; validating, by a control node, the result of the control and quality check and determining if an exception should be triggered; generating an analysis of the partitions; generating a visualization of the summarized explanations and relevant feature attributions; and outputting the analysis of the partitions, visualization of the summarized explanations, and relevant feature attributions.

In a third aspect, the present disclosure provides a system for an explainable artificial intelligence (XAI), the system comprising: an input layer which receives an input and identifies one or more input features; a conditional network, comprising: a conditional layer configured to model the input features based on one or more partitions, wherein each of the one or more partitions comprises a rule, and wherein the conditional layer further comprises at least one human-defined rule; wherein each of the one or more partitions forms at least one local model, and a combination of local models forms a global model, wherein one or more activation paths throughout the partitions are identifiable, and wherein each partition is explainable and interpretable, such that each local model formed from the partitions is explainable and interpretable, and the global model formed from the combination of local models is explainable and interpretable, and wherein an explanation is formed with the output in a single feed forward step; an aggregation layer configured to aggregate one or more rules into one or more of the partitions; and a switch output layer configured to selectively pool the aggregated partitions from the aggregation layer with the remaining partitions from the conditional layer; a prediction network, comprising: a feature generation and transformation network comprising one or more transformation neurons configured to apply one or more transformations to the input features; a fit layer configured to combine features which have been transformed by the feature generation and transformation network to identify one or more coefficients related to at least one of: one or more features and one or more partitions; and a value output layer configured to output a value related to at least one of: one or more features, one or more partitions, as applied to the one or more coefficients; a user input layer configured to receive user input and update the conditional network and prediction network based on the user input, and insert one or more additional partitions based on the user input; and an output layer configured to present an output which is interpretable and explainable by at least one of a machine program or a human.

The methods described herein may be performed by software in machine-readable form on a tangible storage medium e.g. in the form of a computer program comprising computer program code means adapted to perform all the steps of any of the methods described herein when the program is run on a computer and where the computer program may be embodied on a computer-readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously. The software may be adapted to be implemented on a device or apparatus.

The embodiments throughout this application may be combined as appropriate, as would be apparent to a skilled person, and may be combined with any of the aspects or options of the invention.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 12 is a schematic flowchart of an exemplary model induction method.

FIG. 13 is an exemplary schematic flowchart illustrating a high-level induction process.

DETAILED DESCRIPTION

Figure 1A:
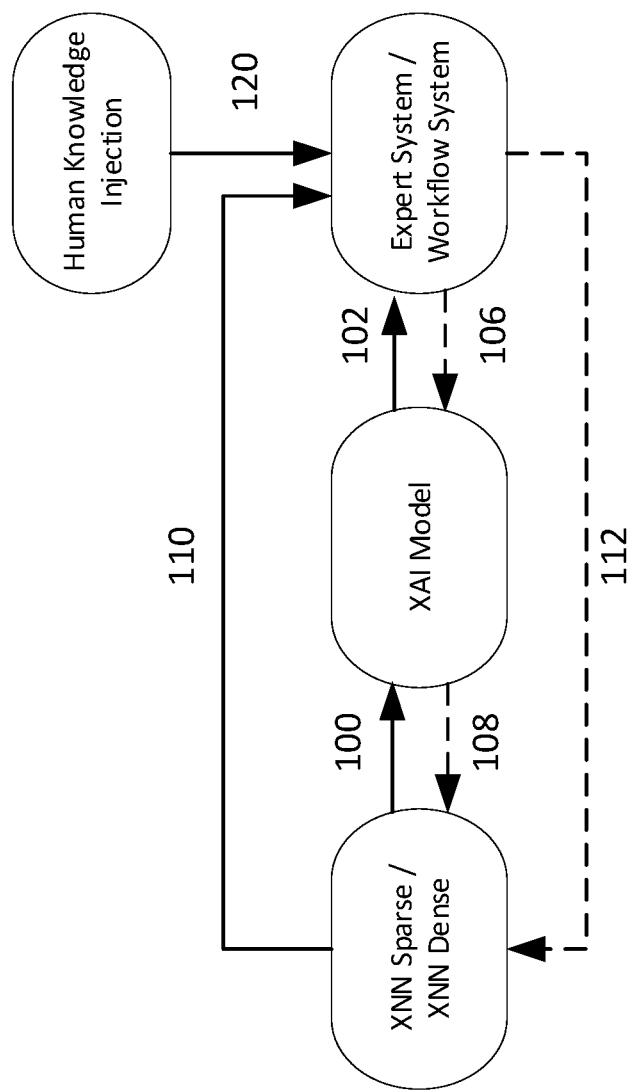
FIG. 1A is an exemplary embodiment of a schematic flowchart illustrating a conversion system for human knowledge injection with expert system integration.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

The terms interpretable and explainable may have different meanings. Interpretability may be a characteristic that may need to be defined in terms of an interpreter. The interpreter may be an agent that interprets the system output or artifacts using a combination of (i) its own knowledge and beliefs; (ii) goal-action plans; (iii) context; and (iv) the world environment. An exemplary interpreter may be a knowledgeable human.

An alternative to a knowledgeable human interpreter may be a suitable automated system, such as an expert system in a narrow domain, which may be able to interpret outputs or artifacts for a limited range of applications. For example, a medical expert system, or some logical equivalent such as an end-to-end machine learning system, may be able to output a valid interpretation of medical results in a specific set of medical application domains.

It may be contemplated that non-human Interpreters may be created in the future that can partially or fully replace the role of a human Interpreter, and/or expand the interpretation capabilities to a wider range of application domains.

There may be two distinct types of interpretability: (i) model interpretability, which measures how interpretable any form of automated or mechanistic model is, together with its sub-components, structure and behavior; and (ii) output interpretability which measures how interpretable the output from any form of automated or mechanistic model is.

Interpretability thus might not be a simple binary characteristic but can be evaluated on a sliding scale ranging from fully interpretable to un-interpretable. Model interpretability may be the interpretability of the underlying embodiment, implementation, and/or process producing the output, while output interpretability may be the interpretability of the output itself or whatever artifact is being examined.

A machine learning system or suitable alternative embodiment may include a number of model components. Model components may be model interpretable if their internal behavior and functioning can be fully understood and correctly predicted, for a subset of possible inputs, by the interpreter. In an embodiment, the behavior and functioning of a model component can be implemented and represented in various ways, such as a state-transition chart, a process flowchart or process description, a Behavioral Model, or some other suitable method. Model components may be output interpretable if their output can be understood and correctly interpreted, for a subset of possible inputs, by the interpreter.

An exemplary machine learning system or suitable alternative embodiment, may be (i) globally interpretable if it is fully model interpretable (i.e., all of its components are model interpretable), or (ii) modular interpretable if it is partially model interpretable (i.e., only some of its components are model interpretable). Furthermore, a machine learning system or suitable alternative embodiment, may be locally interpretable if all its output is output interpretable.

A grey-box, which is a hybrid mix of a black-box with white-box characteristics, may have characteristics of a white-box when it comes to the output, but that of a black-box when it comes to its internal behavior or functioning.

A white-box may be a fully model interpretable and output interpretable system which can achieve both local and global explainability. Thus, a fully white-box system may be completely explainable and fully interpretable in terms of both internal function and output.

A black-box may be output interpretable but not model interpretable, and may achieve limited local explainability, making it the least explainable with little to no explainability capabilities and minimal understanding in terms of internal function. A deep learning neural network may be an output interpretable yet model un-interpretable system.

A grey-box may be a partially model interpretable and output interpretable system, and may be partially explainable in terms of internal function and interpretable in terms of output. Thus, an exemplary grey-box may be between a white-box and a black-box on a scale of most explainable and interpretable (white-box) to least explainable and interpretable (black-box). Grey-box systems may have a level of modular interpretability since some of their components may be model interpretable.

It is understood that some neural network architectures output interpretable results, but these results are not fully model interpretable. Hence, these neural network architectures are considered black-box, or grey-box if some inner components are considered model interpretable. XNNs offer advantages over these neural network architectures, for example, by providing an output interpretable and fully model interpretable system (white-box). Unlike XNNs, traditional neural network architectures do not use partitions to structure the model into well-defined and interpretable local models. Additionally, since traditional neural networks may only be output interpretable, it may not be possible to encode the network into machine and human readable rules. Therefore, they may only provide local explanations, and may not be capable of providing global interpretability directly from the model structure. Other types of neural network architectures may have similar drawbacks. Since none have the concept of partitioning, the functions that model the different components may require a complex non-linear transformation, which may turn out to be entirely a black-box component; thus, the model may only be output interpretable and not model interpretable. For full model interpretability understanding of the model, the transformations within the different components should also be interpretable. XNNs may adopt a wide-network approach through the different partitions, thus enabling transformations to be simpler and easier to understand, rather than complex and impossibly opaque as with deep networks. It may be further contemplated that XNNs may also support inner components which make use of a deep network structure, thus in combination, superior over any existing neural network architectures.

While present technologies may use some form of a linear equation to model an explainable function using a neural network, XNNs differ in several aspects: First, XNNs use the notion of hierarchical features (or hierarchical concepts) through the notion of partitions and rules. In XNNs, the function $f(x)$ can be seen as a local function, which models the feature importance within a specific partition. The combination of all the functions creates a global interpretable model. Further, XNNs may utilize an external process to identify suitable partitions during their initialization, yet also support further training using back-propagation and related technique. Current technology relies solely on using back-propagation to learn a function which may limit the level of explainability.

Since XNNs may be encoded into rules and may make use of an external process to initialize the structure of the XNN partitions, it is possible to embed human-knowledge within the neural network. Thus, XNNs and other logically equivalent XAI models can mix human knowledge and machine-generated knowledge. Through the use of gradient descent methods such as back-propagation, knowledge in the form of rules could be refined to create a global model which can also function in a local manner. The current technology is not capable of functioning as such, as a typical neural network is simply used to fit a single large function.

Figure 1B:
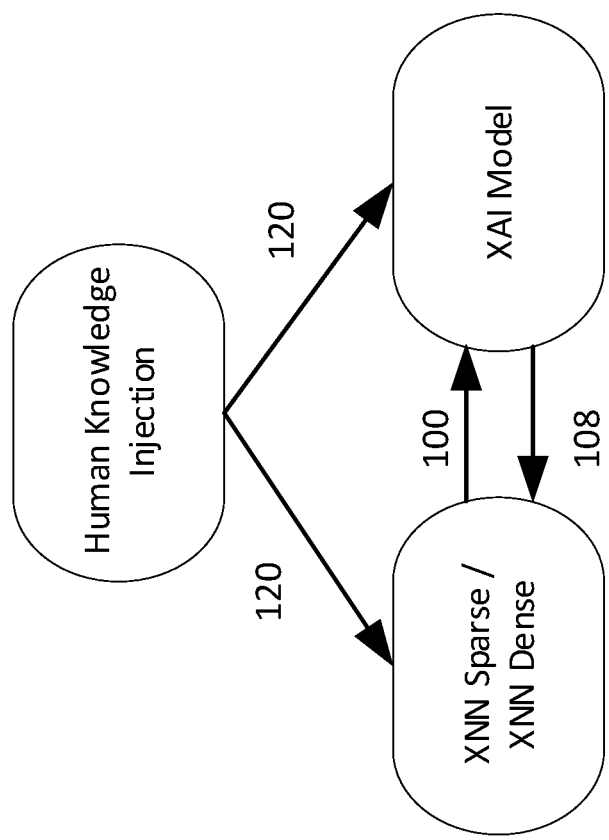
FIG. 1B is an exemplary embodiment of a schematic flowchart illustrating a conversion system for human knowledge injection with expert system integration.
Figure 2:
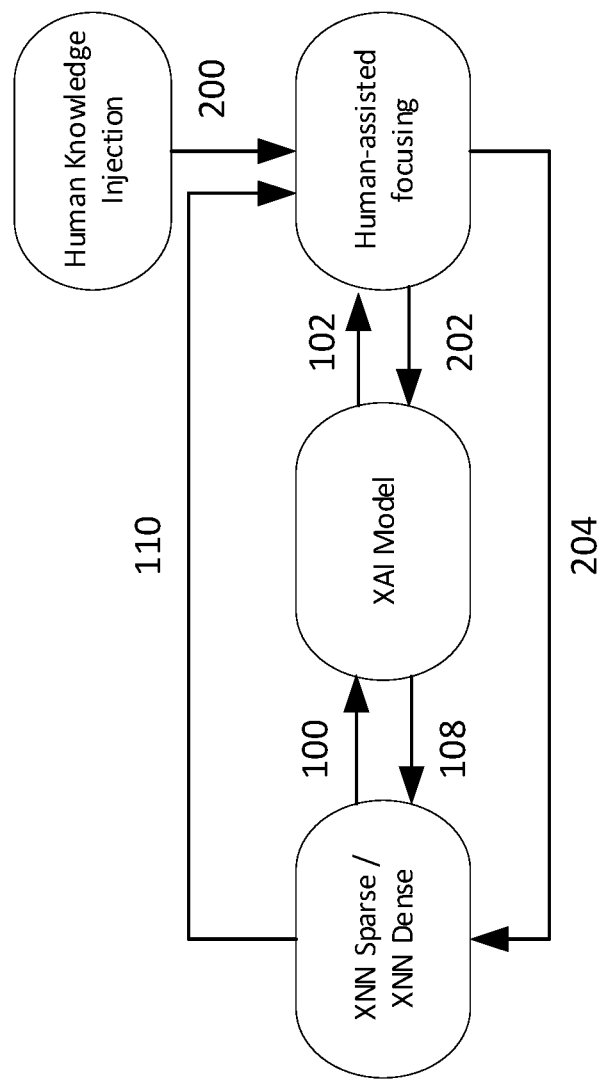
FIG. 2 is an exemplary embodiment of a schematic flowchart illustrating human-assisted focusing of partitions.

As provided herein, human knowledge injection may refer to the process of embedding human knowledge within an existing XAI/XNN. Human knowledge injection may be achieved through the integration and use of an expert system and/or a workflow system as shown in FIGS. 1A and 1B. An alternative embodiment of human knowledge injection is also possible through human-assisted focused partitions, as shown in FIG. 2. Other variants of the above, such as a system which combines more than one expert system, may likewise be contemplated.

In both approaches, the human knowledge may be embedded in an XAI or XNN model through the necessary transfer learning/conversions which may be applicable depending on the compatibility of the human knowledge. The compatibility of the human knowledge may be determined according to a universal representation format. Essentially, any human knowledge that can be represented in a format compatible with the Universal Knowledge Representation format may be incorporated within the XAI or XNN model. The rule representation format may include a system of Disjunctive Normal Form (DNF) rules or other logical alternatives, like Conjunctive Normal Form (CNF) rules, Boolean logic, first order logic, second order logic, propositional logic, predicate logic, modal logic, probabilistic logic, many-valued logic, fuzzy logic, intuitionistic logic, non-monotonic logic, non-reflexive logic, quantum logic, paraconsistent logic or other suitable type of logical system for the expression of logical or similar statements.

Human knowledge can improve XNNs by refining the rule-based knowledge bases in the XNNs via gradient descent techniques. In an exemplary embodiment, special configurations may be applied to lock specific neurons or layers, thereby preventing the network or system from updating those neurons or layers. The human knowledge can be fixed, while still allowing the machine-generated rules to be updated in a global manner. Thus, humans may assert control and embed rules, desired behavior, and potential safety features within the resulting machine-generated system, safe in the knowledge that these directives will not be changed over time by the AI system. When directives are incorporated into the AI system, a sub-set of the weights and functions representing these directives may be marked as static information when implemented in software or as static hardcoded circuit when implemented in hardware. Such a configuration still allows for the rest of the AI system to be trainable and refinable using standard machine learning methods such as gradient descent methods or back-propagation, but guarantees that the original directives will be left unchanged over a potentially large number of training iterations and automatic modifications. This static and unchanging guarantee provides peace of mind to human designers who may want to ensure that a particular directive, especially one related to safety, desired behavior, ethical concern or some other related desired property cannot be overridden or modified by the AI system during its normal operation or during training or related modes of operation. Of particular interest is a static hardware implementation which may be even more robust to change tampering. A suggested typical embodiment would be to incorporate a safety oriented Micro XNN using hardware within a critical path of a larger XNN based system, thus guaranteeing that such directives cannot be changed by the AI system. This solution provides a practical way of incorporating safety features, kill switches and ethical watchdog monitors into AI systems that cannot be overridden by the AI system itself. Training data may consist of a number of data points which contain feature data in various formats including but not limited to 2D or 3D data, such transactional data, sensor data, image data, natural language text, video data, audio, haptic, LIDAR data, RADAR, SONAR, and the like. Data points may have one or more associated labels which indicate the output value or classification for a specific data point. Data points may also result from an internal and/or external process that outputs a combination of synthetic data points, perturbed data, sampled data, or transformed data. Data points may also be organized in a temporal manner, such that the order of the data points denote a specific sequence. For example, the data points may be representative of medical images or scans for a patient that include but are not limited to x-ray, Mill, CAT, PET, and CT scans. The data points may be labelled or annotated by a medical personnel with respect to the condition of the patient.

An exemplary embodiment may utilize different hardware for the implementation, including but not limited to: (i) Application Specific Integrated Circuits (ASICs), (ii) Field Programmable Gate Arrays (FPGAs), (iii) neuromorphic hardware or (iv) analogue/digital circuitry. Hardware may be used for a partial or full implementation of HKI, either involving a complete self-contained system that is used to perform HKI on the device itself via its own dedicated interface, or by providing support for the user interface that is then augmented by appropriate software and/or external information.

It is further contemplated that a hardware implementation may also be utilized to implement the end output resulting from the HKI process. In some cases, such as safety boundaries, ethical applications and safety applications, the incorporation of human provided rules and information may prove beneficial. A secure processor, secure crypto-processor, hardware security module, trusted platform module or appropriate hardware device may be used for implementation. An exemplary application may be in a factory or warehouse utilizing autonomous robots that adapt to changing environments, where people may come into close vicinity of robots. The safety parameters loaded into the robot's behavioral model, linked to the explainable system controlling the robot may be coded in a secure processing hardware environment to provide an element of tamper proofing, as tampering in such an application may lead to potentially unsafe situations for the people interacting with the robots.

An exemplary embodiment may implement the HKI methods and techniques within a neuromorphic hardware architecture. Explainable models such as XNNs, enable such architectures to be made understandable by presenting a white-box model that can be further presented to people in the form of rules and/or workflows. This surface representation form can be edited and then seamlessly reconverted back into the neural, connectionist format that is needed for neuromorphic hardware. Such an exemplary embodiment provides a practical solution for editing, adding, and deleting relevant information and consequently changing the behavior of neuromorphic devices in a controlled, reliable and replicable manner.

An exemplary embodiment may implement the HKI methods and techniques within a quantum processing system. It may be contemplated that an explainable model implemented on a quantum processing system with HKI methods may have rules that are similar to classical explainable models with the addition of quantum specific extensions. For example, such an extension may allow for the specification of quantum annealing effects and their correct interpretation. In another example, an extension may allow for the correct interpretation of multiple qubit states, qubit basis states, mixed states, Ancilla bits, and other relevant quantum effects due to entanglement and/or decoherence. In another example, an extension may allow for the introduction of quantum logic specific operators and/or hardware logic gates, such as quantum CNOT, C SWAP, XX, YY, ZZ gates, Pauli gates, Hadamard gates, Toffoli gates and other relevant quantum logic operations that may be combined serially or in parallel.

An exemplary embodiment may use HKI methods and techniques within an Explanation and Interpretation Generation System (EIGS), allowing for seamless bi-directional collaboration to be achieved within an EIGS based system.

Expert systems rules (and hence the resulting XAI models) may be more expressive and powerful than XNNs as they are capable of modelling knowledge beyond the capabilities of XNNs. XAI models can incorporate any type of rule within their rule sets and rule groups, enabling them to theoretically express and implement any type of computer program possible, which may not be the case for XNNs and any other ANN based connectionist model. A rule set may be defined as a list of rules representing the entire XAI/XNN Model, or any other logically equivalent variants. A rule set may contain one or more rule groups. Rule groups may be organized in a hierarchical manner such that execution of the rules follows a hierarchy of rules groups. The hierarchy may be equivalent to having sub-groups within groups. Rule groups may also serve as way to organize rules and add execution priorities to a group of rules, rather than to individual rules. Rules within rule groups may execute either in a specific sequence determined by the rule priority, in parallel, or a combination of both. When rules execute in parallel, an aggregation function may be required to resolve any potential conflict between multiple rules, or to combine the results from multiple rules. The aggregation function may also be utilized to combine or resolve conflicts from multiple rule groups. For instance, human-defined rules may also be organized in a rule group allocated specifically for human-knowledge injection. When rules are organized in groups, it also allows for evaluating the performance of the entire XAI model (or entire ruleset) in modular manner. In other words, each rule group may have its own evaluation to determine its strength and weakness.

Rule groups also allow conversion back to an XAI/XNN model at a modular level. For instance, the conversion 106 as shown in FIG. 1A, may be done on a specific rule group only, rather than on the entire ruleset, thus enabling further training using XNNs using parts of the model only. Once training is applied, the XNN/XAI Model may be converted back to a rule group as shown in step 110. For example, generalizations of objects within first order and second order logic can be incorporated easily within XAI models, but may be much more difficult (or, with some higher-order logic, even unknown or impossible) to incorporate into ANN based models (including XNNs), even though such systems may in theory have similar capabilities. Using an exemplary embodiment, humans or other appropriate automated systems such as logical reasoning systems may add rules that will give rise to a potential hybrid implementation that may use XNNs for most computational needs and then can use the XNN action trigger and distributed implementation options to selectively use the XAI model rules to incorporate results that are currently beyond the computational expressivity of neural networks. Notably, such a framework may thus make it possible to incorporate any type of XAI model and rule in a complete 1:1 correspondence, allowing the XNN (or other ANN) to benefit from the more complete (and more Turing-complete) functionality of the XAI or XAIs. Additional benefits may particularly be realized as the computational expressivity and power available to neural networks increases, allowing these advantages to be fully incorporated into XNNs.

Figure 3:
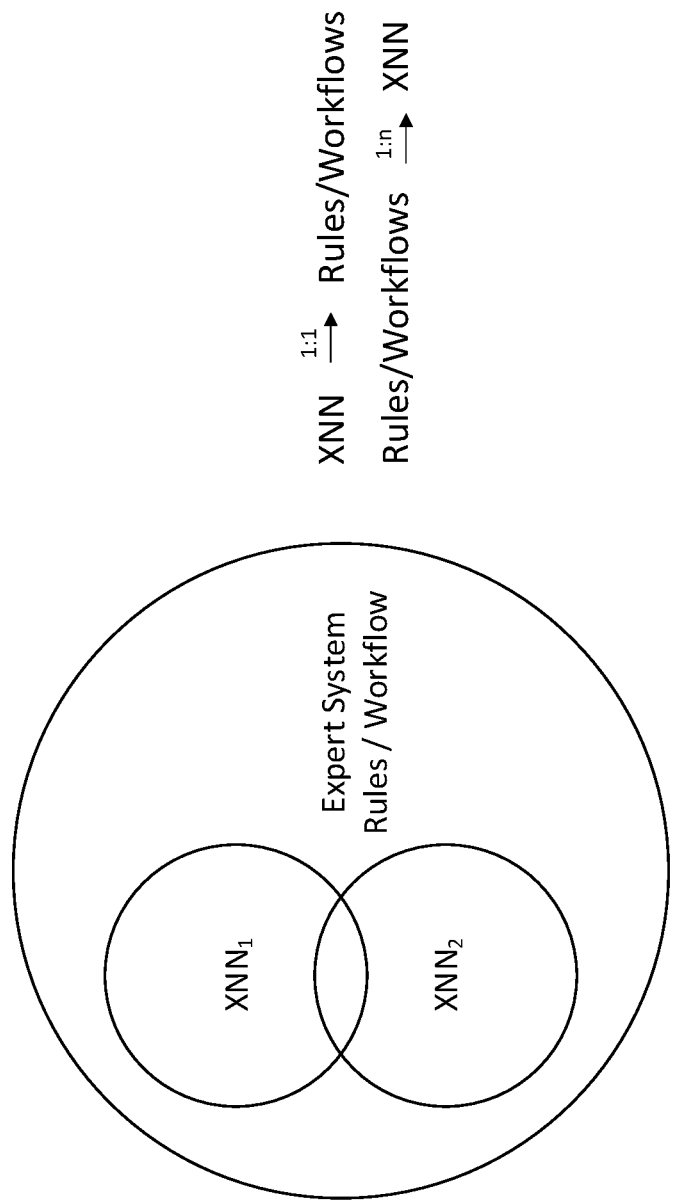
FIG. 3 is an exemplary embodiment of a schematic illustrating an exemplary relationship between XNN and expert system rules.

XNNs may thus be converted to expert systems with a 1:1 correspondence. However, conversion from expert system to XNNs may not be always possible in a 1:1 correspondence but may be possible with 1:n correspondence. FIG. 3 shows the expressive boundaries of XNNs, expert system rules and workflow systems. XAI models can always remain in a 1:1 correspondence with expert system rules and/or workflow systems, although the same 1:n correspondence with XNNs may then apply if human knowledge is injected that does not allow a direct conversion from the resulting XAI model to an XNN and vice-versa.

Referring now to FIG. 1A, FIG. 1A may show how human knowledge may be injected into explainable models. If the model is an XNN, it may be converted to the XAI generalized rule format, as shown in step 100. An embodiment may present a solution to transfer knowledge losslessly from an Explainable ANN implemented as an XNN to a rule-based XAI Model, while preserving both the knowledge in the rules and the explainability and interpretability of the model. In step 102, the XAI model may be exported to an expert system in the form of rules.

Expert systems, workflows and XAI Models may both support the same rule format and may be logically equivalent. However, XAI Models may be machine-generated through an induction method, whereas rules within an expert system or workflows are typically generally created by humans.

Expert systems provide the necessary tools to edit, manage, test, and execute rules. An expert system may act as a knowledge base and allows fusion of different rulesets. Similarly, a workflow is a computational graph with a sequence of operations which may be logically equivalent to a system of rules. Expert systems and workflows may trigger actions and have built-in control and safety features. In general, expert systems and workflows are more powerful than XAI Models, and conversion from an expert system or workflow system back to an XAI model may not be always possible (hence step 112 is dashed). It may also be contemplated that expert systems and workflows may be logically equivalent, hence conversion from expert system to workflows may be done interchangeably.

The export process may include building logically equivalent rules within the expert system. In the case of a workflow system, the export process may include converting into a logically equivalent process. In an alternative embodiment the workflow system may also embed a system of rules as an atomic step in the workflow system. For instance, a rule engine may support decision tables or decision trees, and the conversion process may include migration of the XAI model format to the desired format supported by the expert system. Once the XAI Model is exported, it provides the foundation for human knowledge injection, which allows users to add or edit rules in the case of expert system and to add operations in the case of a workflow system.

In an alternative embodiment, a workflow system may also be converted back to an explainable or interpretable neural network, thus creating an end-to-end computational graph which may be trainable using gradient descent techniques. It is further contemplated that a workflow system may also be converted back to an explainable model, by taking advantage of the white-box nature of explainable models, which most often allows a one-to-one correspondence between workflow nodes and logic and the logical equivalent in the explainable model to be maintained in a bi-directional manner consistently.

Figure 5:
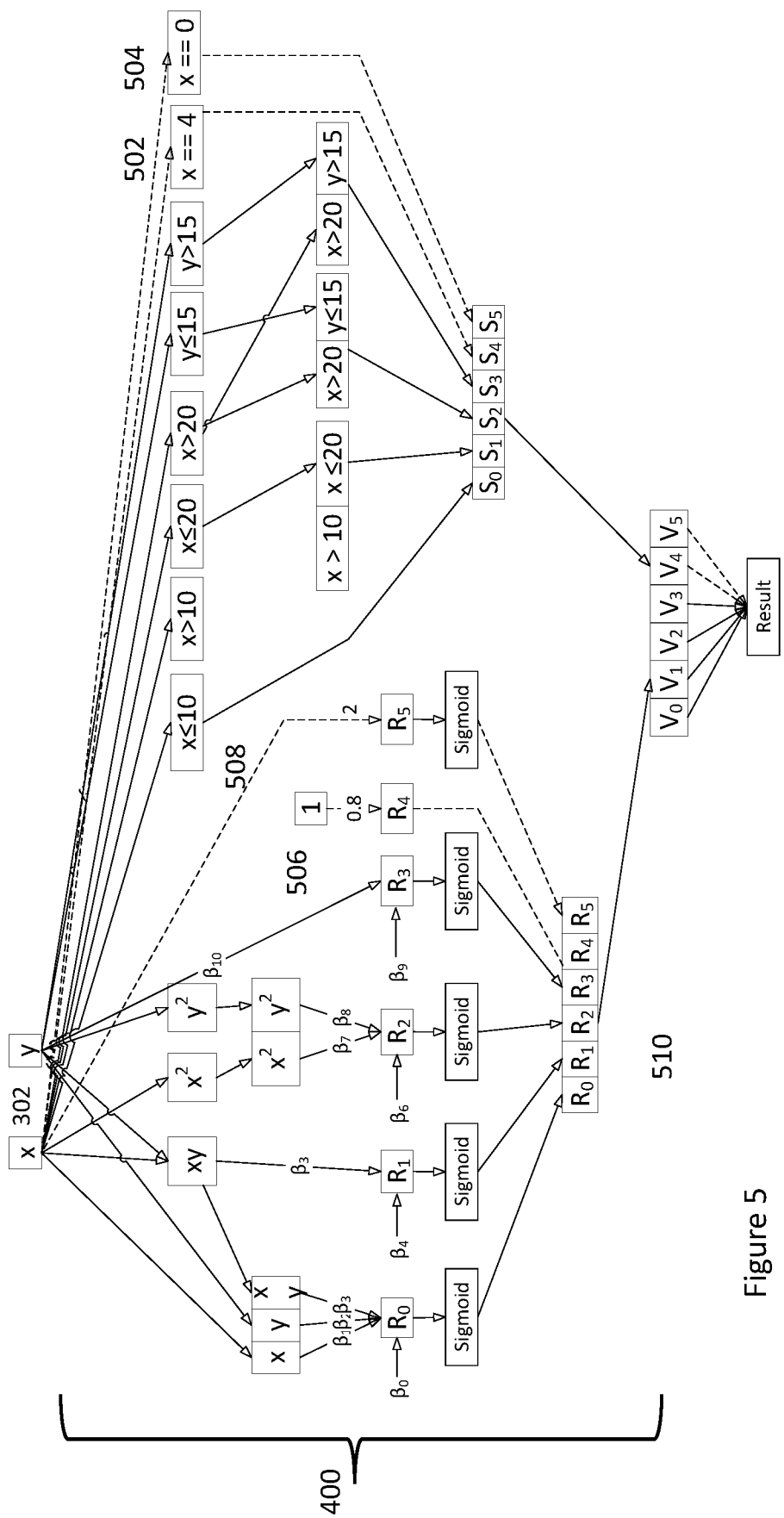
FIG. 5 is an exemplary embodiment of a schematic flowchart illustrating an exemplary sparse XNN which implements human knowledge injection.

The XAI model is structured in a manner that enables a 1:1 conversion from its universal representation format to a system of rules. At this point, human knowledge may be injected via the expert systems or within the workflow system. Human knowledge may be incorporated directly into the XAI model using appropriate tools or interfaces in a similar manner to expert systems or workflow systems. When it comes to XNNs, it may be possible for human knowledge to be incorporated directly into an XNN due to its white-box nature. FIG. 2B shows an exemplary embodiment of such method. Step 120 shows how human knowledge injection may be applied directly. Additionally, FIG. 5 shows an exemplary embodiment of an XNN with human knowledge injection applied, which could have been applied directly or indirectly from an expert system via the necessary conversions.

In practice it may be contemplated to incorporate such knowledge into the expert system representation of the XAI model or directly into the XAI model itself. Similar considerations as for XNNs also apply to XTTs as both XNNs and XTTs may prove too uninterpretable for humans, especially for large scale and complex systems, while XAI models and their expert system representations are more easily interpreted by humans. However, in an exemplary embodiment human knowledge may be injected directly and without conversion to either XNNs or XTTs. (Combinations of this may also be possible; for example, it may be that some particular types of human knowledge may be easier to directly inject than others, and this knowledge may be directly injected while other knowledge is not.) It may also be contemplated that conversion from XNN to expert system, and expert system to XNN may also be applied in a direct manner, as shown in step 110 and 112 respectively.

Figure 10:
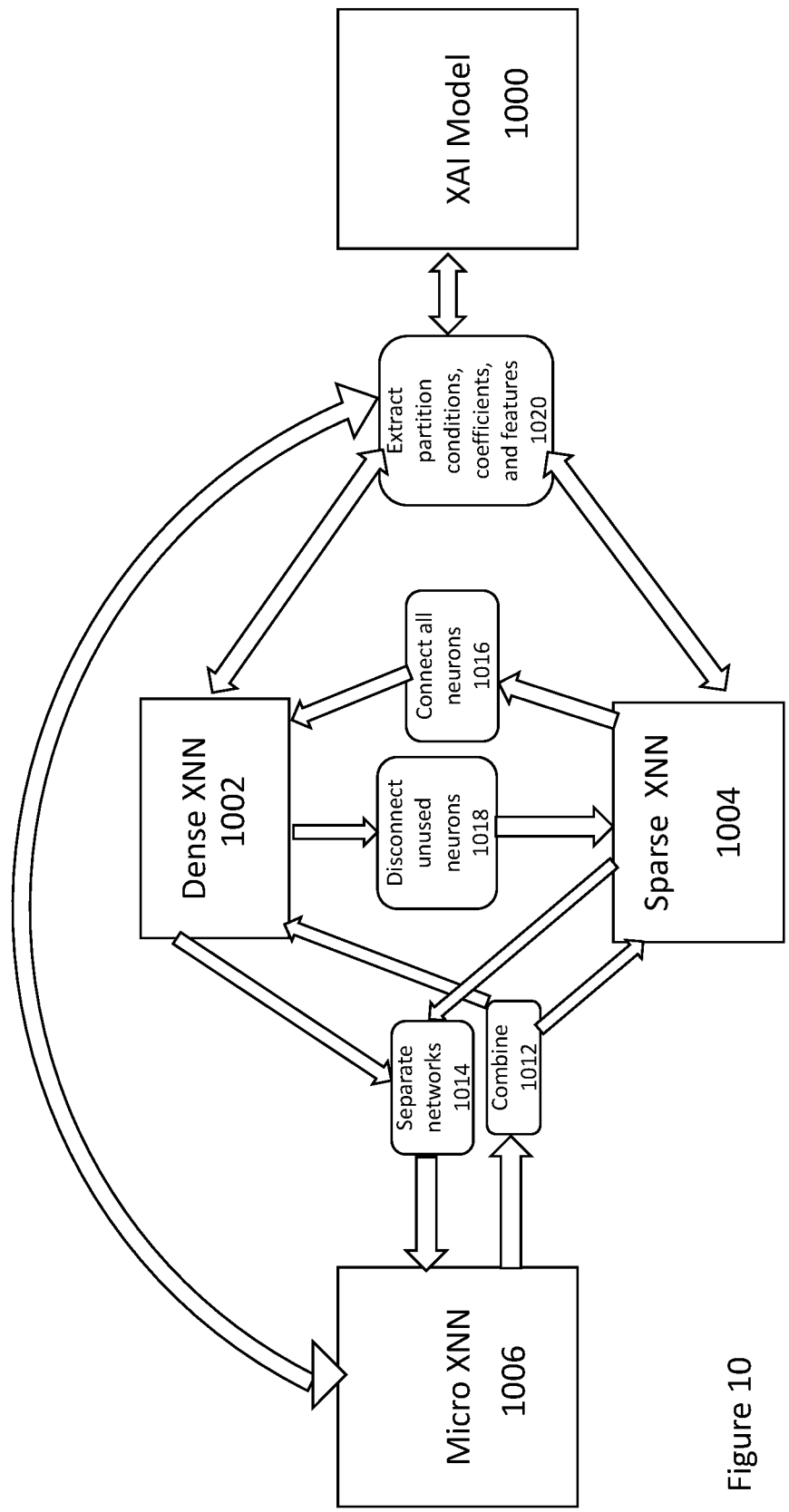
FIG. 10 is an exemplary embodiment of a schematic flowchart illustrating possible conversion between XAI and XNN variants.

Expert systems allow the user to define the logic behind every decision, facilitating the handling of edge cases or specific exceptions. Once human rules are defined, the expert system may combine machine-generated rules and human-generated rules. The newly defined ruleset may be converted back to an XAI model 106. Such conversion may be possible if the newly generated human rules are compatible with the generalized rule format, i.e., the format supported by the XAI model and the XNN model. Various conversions between XNNs and XAI models may be described in further detail with reference to FIG. 10. Further to the conversions described in FIG. 10, all the conversions may be incorporated in a Distributed XNN or Distributed XAI model, where multiple models can be aggregated into a hybrid distributed model that is suitable for implementation on a distributed server or serverless system, or on a multi-core or multi-processor hardware system, or other relevant system that takes advantage of Distributed models.

Several alternate conversions may also be available. For example, one approach may be to execute and process the rules within the context of the expert system only. This approach might not allow the rules to be refined automatically via back-propagation or any other gradient descent technique. In another approach, a non-gradient descent technique such as Particle Swarm Optimization (PSO), Monte Carlo Simulation (MCSM) or other suitable technique may be used to allow the rules to be refined automatically. In another approach, a Distributed XNN or Distributed XAI model may be created to handle highly skewed and/or imbalanced datasets and/or similar type of datasets that exhibit signs of non-standard statistical distribution. In such a scenario, ensemble datasets may be created automatically, by applying under-sampling techniques on the majority class. The resulting parts that cater to the non-majority classes are then flagged for human inspection and possible human correction and/or knowledge injection to mitigate or correct against the adverse effects introduced by such imbalances and/or non-standard distributions.

In a more complex approach, XNNs and expert systems may be fused together in a hybrid implementation to call each other whereby some logic is represented in the form of an XNN, and the non-compatible logic is represented in the form of expert system rules. Since XNNs can trigger external processes and are understandable at a connection by connection and neuron by neuron level, such behavior becomes possible in a modular and properly explainable manner. Additionally, several rulesets defined in an expert system may be fused together in such a way that creates a single and unified XNN. This hybrid implementation can be used to overcome the limitations of neural networks in general by combining the best features of rule based and symbolic processing with connectionist models and associated methods like Deep Learning, providing a practical solution for neuro-symbolic devices and systems.

In an exemplary embodiment, consider the following ruleset.

$$f(x, y) = \begin{cases} \text{Sigmoid}(\beta_0 + \beta_1 x + \beta_2 y + \beta_3 xy), & x \le 10 \\ \text{Sigmoid}(\beta_4 + \beta_5 xy), & x > 10 \wedge x \le 20 \\ \text{Sigmoid}(\beta_6 + \beta_7 x^2 + \beta_8 y^2), & x > 20 \wedge y \le 15 \\ \text{Sigmoid}(\beta_9 + \beta_{10} y), & x > 20 \wedge y > 15 \end{cases}$$

Such rule-based function, may be defined as separate rules:
Rule 0
if x≤10:
    $Y_0$=Sigmoid($\beta_0+\beta_1 x+\beta_2 y+\beta_3 xy$)
Rule 1
if x>10 and x≤20:
    $Y_1$=Sigmoid($\beta_4+\beta_5 xy$)
Rule 2
if x>20 and y≤15:
    $Y_2$=Sigmoid($\beta_6+\beta_7 x^2+\beta_8 y^2$)
Rule 3
if x>20 and y>15:
    $Y_3$=Sigmoid($\beta_9+\beta_{10} y$)

The generalized rule format may be in the form:
    If <Localization Trigger> then (<Answer>, <Explanation>)
When justifications are supported by the explainable model, the rule format may be in the form:
    If <Localization Trigger> then (<Answer>, <Explanation>, <Justification>)
Where <Localization Trigger> may represent the partition condition which activates a partition containing a rule; <Answer> represents the answer when the partition rule is applied to the input and may be a classification, probability/value, or some other result; and <Explanation> may provide an underlying explanation, such as in the form of text or an image which explains which features of the input produced the corresponding answer, and may correspond to the model explanation produced by an explainable model. The <Justification> of the answer and/or its model explanation may be an explanation of the model explanation (i.e., a meta-explanation) that gives additional information about the assumptions, processes and decisions taken by the explainable or interpretable system and/or model when outputting the answer and/or model explanation. In its raw format, the explanation may contain coefficients and/or feature attributions as well information on the triggered partition/localization. Further post-hoc processing on the answer and explanation may be applied to further transform the data in a format suitable for the end user. Human knowledge injection may also be applied on the specific transformations through the workflow system. It may be contemplated that pre-hoc and pre-processing transforms may also be applied to make the information contained within the model easily understood and manipulable by humans. It may be further contemplated that in some cases an inverse post-HKI transform may be applied to reconvert the human readable information back to a more suitable machine readable equivalent. For example, a one-hot encoded vector may be transformed to a human readable set of choices, enumerated data, text, images, and so on for HKI processes. After a decision, or modification has been made by a human user, the relevant information is re-transformed back again into the one-hot encoded vector format.

The input and output transform functions used by the HKI processes may be a pipeline of transformations, including but not limited to polynomial expansions, rotations, dimensional and dimensionless scaling, Fourier transforms, integer/real/complex/quaternion/octonion transforms, Walsh functions, state-space and phase-space transforms, Haar and non-Haar wavelets, generalized L2 functions, fractal-based transforms, Hadamard transforms, Type 1 and Type 2 fuzzy logic, knowledge graph networks, categorical encoding, difference analysis and normalization/standardization of data. The HKI transform function pipeline may further contain transforms that analyze sequences of data that are ordered according to the value of one or more variables, including temporally ordered data sequences. The HKI transform function pipeline may generate new features, including both unstructured and structured information, based on a combination of information present in the explainable model and the information resulting from the HKI process.

Expert systems typically include a set of triggers and actions. A trigger may be represented by one or more partition conditions. In this example, x≤20 is the localization trigger for the first rule (Rule 0), and x>10∧x≤20 is the localization trigger for the second rule (Rule 1). According to the generalized rule format, the <Localization Trigger> represents the trigger of the expert system, and the action includes the combination of <Answer> and <Explanation>. The <Localization Trigger> may also represent a condition based a combination of one or more application logic, taxonomical knowledge, ontological knowledge, behavioral constraint model, attention model, semantical model, syntactical model, or business logic that represents the precise condition when an expert system rule triggers or workflow node is activated.

It may be further contemplated that in expert systems and workflow systems, the right-hand side ("then") part of a rule may be of the form:
    If <Localization Trigger> then (<Process Definition>)
The <Process Definition> part of the rule may contain a process description in a suitable format, such as a list of rules, a list of instructions in a programming language, a set of logical statements, a Petri net, or a workflow specification. It may be further contemplated that an XAI model or an XNN/XTT/XRL/XAED/XGAN/XSN/XMN may be embedded recursively within a <Process Definition>. A process defined within a <Process Definition> may either:

(i.) output a combination of the <Answer>, <Explanation>, and <Justification>, in which case it is referred to as a model output process, or (ii.) not output any part of the <Answer>, <Explanation>, and <Justification>, in which case it is referred to as a non-model output process.

It may be further contemplated that a process definition may contain an interaction with a human, either in an interactive (synchronous) or non-interactive (asynchronous) manner. Such processes are referred to as Human in the Loop (HIL) processes. In an exemplary embodiment, an HIL process may be utilized to approve or reject a recommended decision being proposed by an explainable system after offering a combination of Answer, Explanation and/or Justification to the human user. In a further exemplary embodiment, a rule variable, or workflow variable or other suitable data storage may be utilized to keep track of a sequence of interactions with a human user, allowing interactive dialogue and interactive sessions to be implemented.

An expert system also may need to identify the order and priority in which rules should be triggered, and how multiple actions from multiple triggers resolve to the final answer. For example, when rules have non-overlapping partitions, the expert system may execute in a "first hit" fashion, such that the first partition or rule identified is the one which is applied. Such a policy ensures that only one rule is triggered, and thus, only one action (i.e., only one combination of <Answer> and <Explanation>) is executed. The order of the rules may be configured such that the most popular partitions (i.e., rules), should have higher priority compared to the ones which trigger in less frequent cases. Higher priority rules may execute before the ones with lower priority.

Rules may also have frequency information associated with them according to their frequency of execution, giving an indication of their commonality or, conversely, their rarity. Rules may have a variety of metadata associated with them, that may be either domain independent or domain dependent. Rules may also have links to taxonomies, ontologies and causal models. Rules may also have an impact assessment associated with them, according to various assessment criteria set against different impact assessment criteria thresholds and values. Impact assessment criteria thresholds and values may be determined automatically via machine learning techniques and/or modified via HKI techniques. For example, a rule in an explainable financial loan processing system may have an impact assessment against criteria for gender bias. The same decision is taken with the exact same parameters, allowing only for a change of genders, and the change in the overall result is compared. A set of gender bias threshold values are used to determine whether any bias falls within an acceptable or unacceptable category and whether the risk should be flagged up for further human review and oversight. In another example, a medical implementation of an explainable system utilizing HKI techniques, may utilize automated classification information of an CT scan and perform impact assessment against diagnosis severity criteria, for example, from an analysis coming from a CNN-XNN system. The thresholds for the severity criteria are automatically suggested by appropriate machine learning techniques, such as clustering, principal component analysis or bucketing techniques. These thresholds are reviewed and may be modified by one or more human experts to ensure compliance with, for example, current medical protocols, standards and accepted practices. New value suggestions and refinements from the explainable system may lead to an effective collaboration in which new knowledge is gained by the human experts from the explainable AI system. HKI methods allow humans to bridge this loop backwards, giving a practical implementation solution for the incorporation of a collaborative feedback loop.

Explainable systems that incorporate causal models, such as causal Directed Acyclic Graph (DAG) diagrams, Structural Causal Models (SCM), Structural Equation Models (SEM) and other suitable incorporation of cause-and-effect with explainable machine learning may also utilize the HKI methods disclosed herein. In an exemplary embodiment, HKI processes may be used to edit, modify, and incorporate new endogenous and/or exogenous causal variables, and help identify the proper direction of cause-and-effect in such models. HKI processes may also be used to determine whether automatically identified potential gaps and unknown variables in causal models should be included or excluded from the explainable causal system and potentially assign a human friendly label to such variables. HKI processes may also be used to correct and approve different rules, workflows and similar information that may arise out of the application of causal models, such as interventions, counterfactual analysis, simulations, direct and indirect effect estimations and the like.

In the case of overlapping partitions, a priority function may be used in order to determine which rule to trigger. Alternatively, multiple rules may also be triggered, and the result could be the weighted combined output from all the triggered rules. Such weights may also be determined according to a priority function. Besides a weighted result, any other aggregation function may be used for combining results from multiple rules or partitions.

According to the generalized rule format, an adjustment function may alter the priority vector depending on the query vector Q. $f_{cp}(P, Q)$ gives the adjusted priority vector $P_A$ that is used in the localization of the current partition, or localization of the current expert system rule. In case of non-overlapping partitions, the P and $P_A$ vectors are simply the unity vector and $f_{cp}$ is thus a trivial function as the priority is embedded within the partition itself.

Figure 4:
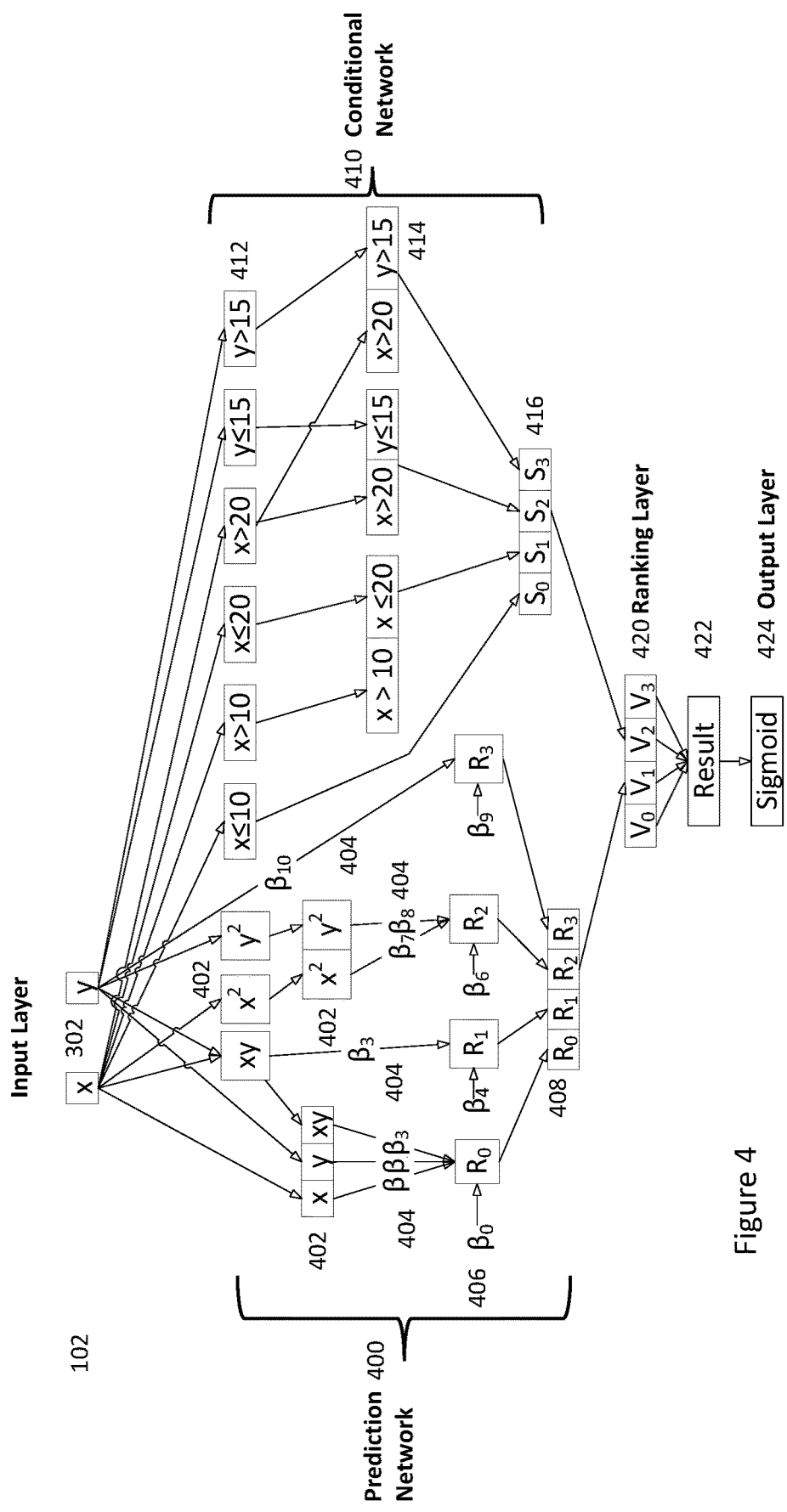
FIG. 4 is an exemplary embodiment of a schematic flowchart illustrating an exemplary sparse XNN.

In optional step 110, an XNN may be converted to an expert system. The knowledge in this ruleset includes partitions and several linear functions, which are logically equivalent to the rule-based format. In FIG. 4, an exemplary XNN is used to demonstrate the conversion process from XNN to an expert system.

FIG. 4 may provide illustrated definitions for $R_0$ to $R_3$ in the form of a prediction network 400. In a prediction network 400, the input features 302 or transformed features 402, such as $x^2$, $y^2$, xy, x, and y, are weighted by the weight coefficients 404 $\beta_0$ to $\beta_{10}$, in order to produce the rules 406 $R_0$ to $R_3$. The resulting values for rules $R_0$ to $R_3$ may be combined and/or outputted in a value output layer 408.

A conditional network 410 defines the conditional portion of the ruleset or model. The conditional network 410 may include three main layers that can be combined depending upon the implementation constraints. The conditional layer 412 is initialized according to the hierarchy of partitions being implemented in the XNN. The aggregation layer 414 is initialized for the first time by the process that defines the XNN and can be subsequently refined using gradient descent methods such as back propagation. The conditional network may be trainable or non-trainable. In the latter case, when applying back-propagation, the partitions remain static and only the value/prediction network is refined.

The conditional layer 412 may be initialized through the "if" conditions defined in the XAI model. For example, "if $x \leq 10$" may be defined in the XAI model and will generate a neuron in the transformed XNN model for $x \leq 10$. An "if"

condition with x>10 and x≤20 will generate the aggregated neuron in the aggregation layer 414 for [x>10, x≤20]. The output of each neuron may be either 1 or 0. The switch output layer 416 combines the results of the aggregation layer 414 and conditional layer 412 together.

As illustrated in exemplary FIG. 4, each condition may be split into partitions. Each neuron in the conditional layer 412 may represent a single partition. For example, "y>15" may be a single partition, representing a single rule which applies where "y>15" (and, thus, not in the alternative case where y≤15). Then, the partition may be combined with another partition in the aggregation layer 414. In the aggregation layer 414, the partition "y>15" is combined with the partition "x>20". These two partitions are then combined to create S3, in the switch output layer 416.

The resulting combination may produce a set of values 420, $V_0$ to $V_3$ in this exemplary embodiment. The set of values 420 may be further modified by the weights $P_0$ to $P_3$, in order to produce a result 422. The weights may also or alternatively be non-trainable and set to a fixed value of 1. The decision on what weights can be trainable (and thus changeable by the AI system) and what is non-trainable (and thus non-changeable by the AI system) can always be made under human control and supervision. Finally, the result may be modified by an activation function 424.

An XNN structure which is logically equivalent to an XAI ruleset may be converted directly to a system of rules within an expert system.

Referring now to exemplary FIG. 5, FIG. 5 may illustrate an exemplary injection process. A human user may inject custom rules or exceptions. (As noted above, this may allow the system to better handle edge cases, specific exceptions, and the like, which may be better handled by an expert system.) Exemplary human-generated rules may be:

Rule 4 (Human-Generated)
If x==4 Then
  $Y_4$=0.8
Rule 5 (Human-Generated)
If x==0 Then
  $Y_5$=Sigmoid(2x)

These rules may be converted back as part of the XAI model:

$$f(x, y) = \begin{cases} \text{Sigmoid}(\beta_0 + \beta_1 x + \beta_2 y + \beta_3 xy), & x \leq 10 \\ \text{Sigmoid}(\beta_4 + \beta_5 xy), & x > 10 \wedge x \leq 20 \\ \text{Sigmoid}(\beta_6 + \beta_7 x^2 + \beta_8 y^2), & x > 20 \wedge y \leq 15 \\ \text{Sigmoid}(\beta_9 + \beta_{10} y), & x > 20 \wedge y > 15 \\ 0.8 & x == 4 \\ \text{Sigmoid}(2x) & x == 0 \end{cases}$$

In this case, the addition of Rule 4 may cause a conflict. When x=4, two rules will trigger: Rule 0 because x≤10 and Rule 4 because x==4. In such event, a priority function may determine which rule to trigger (such as always triggering the human-defined rule first or always triggering the most recently defined rule first), or, alternatively, the result may be a weighted sum of both answers. A similar conflict also occurs when x==0, which may be handled similarly.

The exemplary human rules may be implemented to an exemplary XNN, as depicted in FIG. 5. The newly created human-generated trigger 502, x==4, and trigger 504, x==0, may be inserted into the conditional layer 412. In an optional embodiment, the triggers 502 and 504 may be combined with each other or another condition/trigger in the aggregation layer 414. Next, a constant input 506, in this case 1, has been created, since the output value when Rule 4 is activated is fixed and has no relationship with the input x or y. However, the newly generated connection 508 for Rule 5 is created via the input x and therefore has a corresponding rule value in the prediction network. It may be noted that the weights have been directly coded to map the user-generated rules. The sigmoid functions may be moved to before or after the result. When all rules have a sigmoid function, and the rules are non-overlapping, it is logically equivalent to place the activation function at the end of the XNN. Since XNNs are entirely white-box, it may be possible to move the active functions while retaining logical equivalence. This possibility also allows for various optimizations to take place, with the aim of increasing performance, throughput, space usage and the like.

In an exemplary embodiment, a human may also choose to edit one or more conditions in the rules (the "if" part) by adding further conditions to the existing conditional expression in the conditional part of the appropriate rules. The localization trigger may be a sub-set of the conditional part of the rule. Continuing with the example, this could be used to add, delete or modify a condition that performs a comparison against a constant, value obtained from another rule, value obtained from a function or expression, or some other data which can be retrieved from an internal and/or external source. For example, in a medical application embodiment, a new type of sensor that has just become available may be integrated within an existing, regulatory approved explainable model via the introduction of sensor data inputs that are integrated via human editing, including cases when the medical device is being controlled by an XNN, which is something that would not normally be possible with a black-box neural network. In another example, in a telecoms application device embodiment, a prioritized access override for emergency services imposed by regulation may be manually incorporated within the XAI model utilized by the telecoms application device.

Connectionist methods may be combined with symbolic logic processing as implemented in XNNs. Neural networks are typically modeled by a connectionist architecture; various neural units are connected, and each connection could be weighted differently. XNNs may use a connectionist architecture to process incoming input data and extract increasingly complex symbols and concepts from the data. These symbols and concepts can be directly inputted to a symbolic logic system for further processing. An XNN may have an underlying connectionist architecture which incorporates a symbolic logic processing system, thus allowing XNNs to provide a practical solution for a combination of symbolic logic processing systems with a connectionist architecture. The output from a symbolic logic system may serve as the input for further XNNs, thus allowing for a two-way combination of connectionist and symbolic logic systems. Such a combination may also be referred to as a neuro-symbolic system. In an exemplary embodiment, in a medical application involving blood analysis, HKI methods may be used to link the symbols and concepts identified by the kernel labeler in a CNN-XNN system that correspond to different types of blood cells. Tabular, symbolic data is thus extracted from a raw image or video supplied to the explainable system, which can then be processed using standard symbolic processing techniques to give rise to a diagnosis and its underlying explanation. Such an explanation may reference the medical protocol used together with the relevant symbolic information used in the creation of the diagnosis (the answer) and may additionally reference part or whole of the underlying image data used to come up with the answer.

Gradient descent methods such as back propagation may work on the newly injected human knowledge. The weights defined in 506 and 508 may be coded to be non-trainable. This enables the neural network to update the weights without modifying the human knowledge.

For example, in an image processing system, objects in an input visual scene can be identified efficiently by the XNN, and then passed on as inputs to a physics engine and world modelling system. The outputs from such world modelling can be used as further inputs to an XNN, allowing for better processing and better explanations to be built up that have an element of Deep Understanding that is impossible to achieve with typical non-explainable Deep Learning systems and related techniques.

Figure 6:
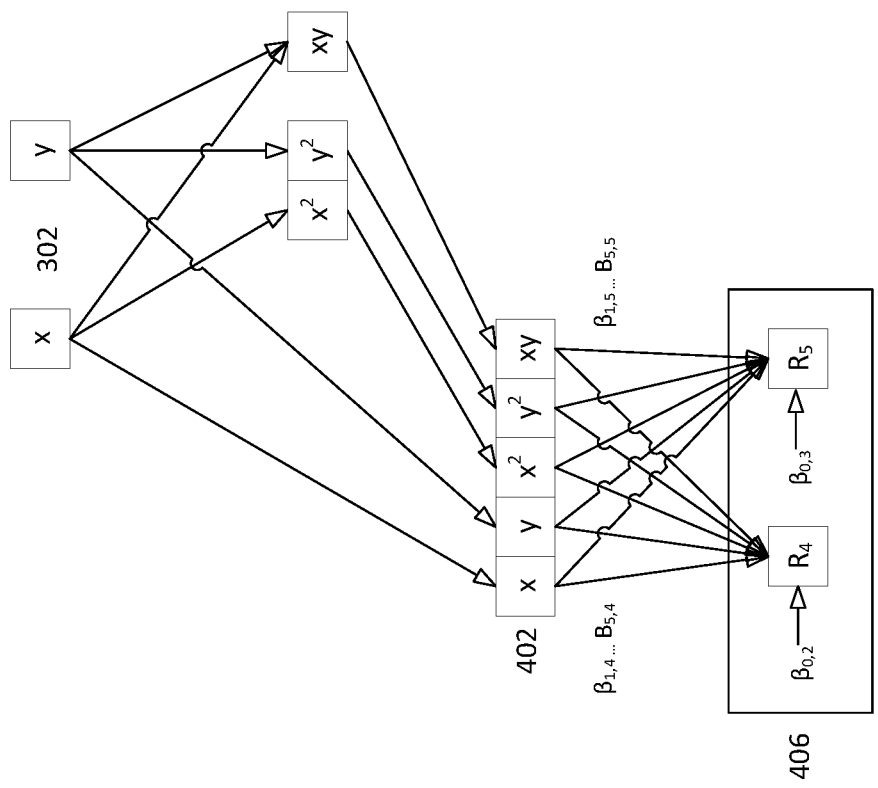
FIG. 6 is an exemplary embodiment of a schematic flowchart illustrating an exemplary portion of an XNN showing the structure of the human-assisted partitions.

The injection process depicted in FIG. 5 is applicable to both sparse and dense XNNs. The exemplary XNN in FIG. 5 utilizes a sparse format, as shown by the prediction network 400. FIG. 6 may illustrate an alternative exemplary embodiment, wherein the XNN implements a dense network. As shown in FIG. 6, the newly created rules are connected to every input and every transformed input/feature. The network is considered dense because every node from one layer (i.e., the transformation layer 402) connects to every node from another layer (i.e., the rule output layer 406). Sparse networks might be used when training is applied on human-generated rules. This enables the newly generated human rules to stay fixed by configuring the neurons/layers to be non-trainable. In a dense structure, all weights are represented as one matrix and specific neurons may not remain fixed. However, a sparse XNN may still be converted into a dense XNN after training is completed.

In a final step, the results of the conditional network and prediction network are combined in the final output layer. The final output layer may incorporate trainable or non-trainable weights, depending on whether overlapping or non-overlapping partitions have been used. When the partitions do not overlap, the weights of the final output layer may be fixed to 1 and may be fixed to non-trainable. When having overlapping partitions, such weights in step 510 may be configured to be trainable in order to learn a weighted score for each rule. When having overlapping partitions, such weights 506 or 508 may be configured to be non-trainable (static) if the partitions need to remain fixed without any possibility of slight adjustments by some appropriate machine learning process. In an alternative embodiment, the priority may also be applied via a fixed priority vector combined (P) with the adjusted priority ($P_A$). The adjusted priority vector introduces a slight change to the architecture, depending on the complexity of the priority function, just prior to the calculation of the weights 510. The priority vector is mainly needed when there are overlapping partitions and the possibility of multiple explanations that need to be ranked in order of some priority function.

Human-assisted focused partitions may be implemented when a human user knows where to look but does not know a specific answer. In a practical embodiment, such as in the medical domain, it may be noted by a medical practitioner that patients within a specific age group and with a specific medical condition, typically exhibit specific behavior which is not currently modelled by the AI model (or XAI/XNN/XTT model). Unlike human knowledge injection directly coded to the XAI/XNN Model where the outcome is known and perhaps static, human assisted focusing allows the creation of a new partition, without specifying the final outcome. Human-assisted focusing may be seen as a method for having user-defined partitions, without specifying the local model within that partition. For example, the partition covered by the specified age group and medical condition may be specified as a partition even though the outcome or result is unknown. Thus, in an exemplary embodiment the conditional part of the network may be specified, but the value part may be unspecified. The outcome may only be known when gradient descent methods, such as back propagation, are applied. Alternative methods for fitting the local model or partition may also be used.

There may be several reasons for applying human-assisted focusing. For example, it may allow for human knowledge and intuition which is beyond what current deep learning alone can achieve. Additionally, XNNs and XAI models, as white box models, enable the accuracy of the predictions and explanations to be evaluated per rule, rather than globally for the entire model. This enables the user of the model to differentiate between weak and strong rules. Weak rules may indicate that human-assisted focusing is required. Thus, human-assisted focusing is meant to improve the model performance by providing better generalization and handling of corner cases assisted by humans. Another reason for applying human-assisted focusing is when a distinctive category of data exists which needs special attention and local explanations.

The human injection process for human-assisted focused partitions consists of defining the specific partitions, that is, rules with a <Localization Trigger> only, and where the <Answer Context> or <Explanation> are not defined. Referring to the exemplary network in FIG. 5, the user may only specify the partition conditions, x==4 and x==0, which lead to the switch outputs S4 and S5. The system will then learn the values of $R_4$ and $R_5$ automatically, without the need to specify a manual value.

The system learns the values $R_4$ and $R_5$ by applying gradient descent (e.g., back propagation) on the network. It may be suitable to train the partial XNN in FIG. 6 on its own before combining it with the rest of the network which trains the values $R_0$ to $R_5$. This allows the neural network to train gradually as well as in a distributed manner. Additionally, if the XNN had to be trained globally after adding a new partition, the model may have a sudden change in internal weights. The white-box nature of XNNs allows for training sub-parts of the model, thus enabling faster convergence by focusing on the weak parts of the model only. Newly added human-assisted partitions may be treated just like a normal partition, the only difference is that the condition of the partition is human-generated. Note that new partitions may also be trained via external methods and then imported in the XNN once they are trained. An example of such approach may be found in the induction method illustrated in FIG. 7.

One major difference between an exemplary embodiment and the former method, is that the coefficients need to be learnt. In the case of an XNN, the weights or coefficients need to be fully connected to the input and transformed input as shown in FIG. 6. All weights need to be trainable. It may also be noted that since the sub network for determining $R_4$ and $R_5$ is fully connected, it may end up with coefficients or weights which are entirely non-zero. Pruning or regularization methods may be applied to encourage unimportant coefficients to become zero-valued, thus enabling the network to eliminate the connections with zero-valued coefficients/weights.

In an alternative embodiment, the newly generated partitions may also learn a local function through a separate process, outside the XNN. Since the XNN is entirely white-box, a method such as an XAI model indication method may be applied in order to learn the rules for $R_4$ and $R_5$. A model of a black-box AI may be an input to the model induction method, along with a set of sample input data, such as training data or synthetically generated data. The model induction method may perturbate the input data in a variety of ways, and the perturbated data may be merged with the sample input data. Next, a predictor function may be used to predict the output of the black-box model. The predictor function may be linear or non-linear. A set of data points may be created by the predictor function. The data points may be partitioned by a partitioning function, such that a partition of data points may represent one or more rules.

An exemplary embodiment may be illustrated in mathematical terms. Referring to the exemplary embodiment in FIG. 12, FIG. 12 may illustrate an exemplary model induction method. In an exemplary embodiment, X may denote the input dataset 1502, and Predict(x) may denote the predictor model function with n outputs 1504. X may be a matrix with m dimensions. Each dimension (m) may represent the input features of X and each output may represent the number of classes (n). The input data set may be a combination of training data and synthetic generated data. Such data may comprise a set of data points. The data points may include numeric or alphanumeric data representing features or parameters from any of herein described models or networks. The data points are stored in suitable formats, which include but are not limited to, for example, formats corresponding to 2D or 3D data, transactional data, sensor data, image data, language text, video data, audio, haptic, LIDAR data, RADAR, SONAR, and the like. Data points may have one or more labels associated with one or more data points which may be indicative of the output value or classification for a specific data point. Data points may also result from an internal and/or external process that outputs a combination of synthetic data points, perturbed data, sampled data, or transformed data. Data points may also be organized in a temporal manner, such that the order of the data points denote a specific sequence. For example, the data points may represent medical images or scans for a patient that include but are not limited to x-ray, MRI, CAT, PET, and CT scans. The data points may be labelled or annotated by medical personnel with respect to the condition of the patient.

Additionally, in an exemplary embodiment the samples may be perturbated 1506 using a function such as Perturbate (X), which may be any perturbation function to generate sample perturbed data, given some input training or test data X, where X may be a subset of the input data, some neighborhood of the input data, some suitable embedding of input/output/explanation data, or may even be trivially the empty set, in which case the perturbation function needs to query the predictor model using some form of a random or non-random pattern. Xp may denote the combination of the perturbated and original input dataset, Y may denote the output from the predictor model function 1508, such that $X_P = X \cup \text{Perturbate}(X)$, and $Y = \text{Predict}(X_P)$.

The hierarchy of partitions may be represented by P through an external function Partition 1510, such that Partition($X_p$,Y)=P, where P={$P_1, \ldots, P_i, \ldots, P_k$} and k is equal to the number of rules in the case where each partition is defined by exactly one rule. The partitioning function may be a clustering algorithm such as k-means, Bayesian, connectivity based, centroid based, distribution based, grid based, density based, fuzzy logic based, entropy, a mutual information (MI) based method, or any other logically suitable methods. The partition function may also include an ensemble method which would result in a number of overlapping or non-overlapping partitions. In the case of overlapping partitions, an aggregation function may be used to combine or split the result from multiple partitions. The partition function may alternatively include association-based algorithms, causality based partitioning or other logically suitable partitioning implementations.

$R_i(x)$ may represent each rule in the $i^{th}$ partition. Each Rule ($R_i(x)$) may include multiple conditions, such that $R_i(x) = C_2 \wedge C_2 \wedge \ldots \wedge C_j \wedge \ldots \wedge C_q$, where q may represent the number of conditions in the rule, and $C_j$ may be the $j^{th}$ condition with respect to the input matrix x of the $i^{th}$ rule (i.e. $i^{th}$ partition). The perturbated input matrix $X_p$ may be divided into k matrices, where k is equal to the number of rules, such that $X_L$ denotes the locally filtered matrix defined by $\{x | x \in X_P \wedge R_i(x) = \text{True}\}$, such that the union of $\{X_{L1}, X_{L2}, \ldots, X_{Li}, \ldots, X_{Lk}\} = X_p$ when partitions are non-overlapping. When partitions overlap on each other the union of $\{X_{L1}, X_{L2}, \ldots, X_{Li}, \ldots X_{Lk}\} \approx X_p$. When partitions overlap each other, a ranking function needs to be applied to choose the most relevant rule or be used in some form of probabilistic weighted combination method. In an alternative embodiment, if more than one partition is activated, some aggregate function is used to combine the results from multiple partitions.

A next exemplary step may involve fitting a local model to each partition, defined by Ri. $X_L$ may represent the inputs that are found in both $X_p$ and $R_i(x)$. In other words, $X_L$ may be the inputs or feature data that apply to the $i^{th}$ rule. The local samples may be filtered 1512. $X_L$ may then be perturbated 1514, and $X_{LP}$ may denote the combination of $X_L$ and a locally perturbated dataset of Perturbate(XL). Thus, $Y_L = \text{Predict}(X_{LP})$ which predicts perturbated data locally 1516. Finally, $X_T$ may be calculated by finding a transformation of $X_{LP}$. 1518, such that $X_T = \text{Transform}(X_{LP})$. The transform function may be a pipeline of transformations, including but not limited to polynomial expansions, rotations, dimensional and dimensionless scaling, Fourier transforms, integer/real/complex/quaternion/octonion transforms, Walsh functions, state-space and phase-space transforms, Haar and non-Haar wavelets, generalized L2 functions, fractal-based transforms, Hadamard transforms, Type 1 and Type 2 fuzzy logic, knowledge graph networks, categorical encoding, difference analysis and normalization/standardization of data. The transform function pipeline may further contain transforms that analyze sequences of data that are ordered according to the value of one or more variables, including temporally ordered data sequences. XT may generate new features, such that z represents the total number of features by the transformation function.

For each j in the range of 1 through n (i.e. the number of outputs), the system may calculate the local model in a linear manner 1520. $Y_L$ is a matrix including n vectors, one for each output, such that $Y_{Lj}$ represents the $j^{th}$ output vector. The linear model can be defined by $Y_{ij} = \text{Fit}(X_T, Y_{Lj})$ where Fit is a function that fits a linear model, such as linear regression, logistic regression, kernel method, etc. The linear model defines a set of coefficients $\{\beta_0 \ldots \beta_z\}$ 1522 such that $Y_{ij} = \beta_0 + \beta_1 x_1 + \ldots + \beta_i x_i + \ldots + \beta_z x_z$. The linear model or a combination of linear models may provide the XAI model with the rules 1524. In an alternative embodiment, the fit of the local models may be achieved in one atomic Fit function using parallel programming or gradient-descent techniques, or a suitable equivalent. Note that $x_i$ could be a transformed feature such as polynomial (such as $x^2$), intersection (such as xy), conditional features (such as x>10 and y<2), Fourier transforms, etc. Note that $\beta_i$ could be either positive or negative, corresponding to positive or negative contributions to the model for the relevant transformed feature. The positive or negative contributions may also be commonly referred to as excitatory and inhibitory influences. Compression or regularization techniques may also be applied to simplify the fit of the local models, which indirectly also simplifies the resulting explanations. Finally, rules may be constructed from the various combinations of $Y_{ij}$.

$$Rule_1(x) = \{Y_{11}, Y_{1,2}, \ldots, Y_{i,n}\} \text{ if } R_1(x)$$

$$Rule_2(x) = \{Y_{21}, Y_{2,2}, \ldots, Y_{2,n}\} \text{ if } R_2(x)$$

$$Rule_i(x) = \{Y_{i1}, Y_{i,2}, \ldots, Y_{i,n}\} \text{ if } R_i(x)$$

$$Rule_k(x) = \{Y_{k1}, Y_{k,2}, \ldots, Y_{k,n}\} \text{ if } R_k(X)$$

Further, additional functions may be applied to the final output of the rule. For example, the softmax function may be used for rules that define a multiclass classification system, such that:

$$Rule_i(x) = \text{Softmax}(\{Y_{i1}, Y_{i,2}, \ldots, Y_{i,n}\}) \text{ if } R_i(x), \text{ and}$$

$$Softmax(x_i) = \frac{e^{x_i}}{\sum_n e^{x_n}}$$

In an alternate exemplary embodiment, the sigmoid function may be applied to the output for application to a binary classification algorithm, such that:

$$Rule_i(x) = \text{Sigmoid}(Y_{i1}) \text{ if } R_i(x)$$

$$Sigmoid(x) = \frac{1}{1 + e^{-x}}$$

The induced model may be expressed in a universal format (such as first order symbolic logic) or may be used directly. It may be contemplated that a logically equivalent process to this induction method, or parts of it, may be re-created using an appropriate machine learning system that has been trained appropriately, for example, via gradient descent techniques, such as neural networks, transducers, transformers, autoencoders, spiking networks, memory networks, and/or reinforcement learning systems. Additionally, the extracted model may be global such that it captures the entire multi-dimensional space of the original model. The global model may be fully interpretable, even if the original model was not, and may still maintain a high-level of model performance or accuracy. The explanation may be completed simultaneously and in parallel with the answer and there may be no performance loss.

Referring now to exemplary FIG. 13, FIG. 13 may illustrate an exemplary method for extracting an explainable white-box model of a machine learning algorithm from another existing system. It may be contemplated that the target system is a black-box system, or any other contemplated system, machine learning algorithm, neural network, or the like. In an exemplary first step, synthetic data and/or training data may be created or obtained 1602. Perturbated variations of the set of synthetic data and/or training data may also be created so that a larger dataset may be obtained without increasing the need for additional synthetic data and/or training data, thus saving resources. It may be contemplated that the synthetic data and/or training data may be normalized prior to step 1602 or within any of the steps 1602, 1604, 1606, 1608, 1610, 1612 and 1614, using a suitable normalization method, such as min-max scaling, standard scaling or other suitable method. It may be further contemplated that an inverse normalization method be applied prior to step 1602 or within any of the steps 1602, 1604, 1606, 1608, 1610, 1612 and 1614, using an appropriate inverse of any normalization method that was applied. The synthetic data and/or training data may then be loaded into the target system as an input 1604. The target system may be a machine learning algorithm of any underlying architecture. The underlying architecture may be a black-box and thus unknown. In an exemplary embodiment, the machine learning algorithm may be a deep neural network (DNN). The target system may additionally contain non-linear modelled data. The underlying architecture and structure of the target model may not be known or needed since it may not be analyzed directly. Instead, the synthetic data and/or training data may be loaded as input 1604, and the output can be recorded as data point predictions or classifications 1606. Since a large amount of broad synthetic data and/or training data can be loaded as input, the output data point predictions or classifications may provide a global view of the target system. In an alternative embodiment, the target model may be split in a suitable manner such that only parts of it are induced by the induction method. For example, in the case of a convolutional neural network (CNN), only the fully connected non-convolutional layers may be induced, leaving the preceding layers (convolutional and pooling layers) to serve as transformed input to the induction method.

Still referring to exemplary FIG. 13, the method may continue by aggregating the data point predictions or classifications into hierarchical partitions 1608. Rule conditions may be obtained from the hierarchical partitions.

The process to find the partitions is, or the boundary of the partition, is an external function defined by Partition(X). Partition(X) may be a function configured to partition similar data and may be used to create rules. The partitioning function may include a clustering algorithm such as k-means, Bayesian, connectivity based, centroid based, distribution based, grid based, density based, fuzzy logic based, entropy or a mutual information (MI) based method. The partition function may alternatively include association-based algorithms, causality based partitioning or other logically suitable partitioning implementations.

The hierarchical partitions may organize the output data points in a variety of ways. In an exemplary embodiment, the data points may be aggregated such that each partition represents a rule or a set of rules. The hierarchical partitions may then be modeled using mathematical transformations and linear models. Any transformation function or combination of transformation functions may be used, including but not limited to polynomial expansion, convolutional filters, fuzzy membership functions, integer/real/complex/quaternion/octonion transforms, Fourier transforms, and others. The transformation function or combination of transformation functions may be applied prior to step 1608 and/or during step 1610. An exemplary embodiment may apply a polynomial expansion. Within step 1608, the hierarchical partitions may also be subject to one or more iterative optimization steps that may optionally involve merging and splitting of the hierarchical partitions using some suitable aggregation, splitting, or optimization method. A suitable optimization method may seek to find all paths connected topological spaces within the computational data space of the predictor while giving an optimal gauge fixing that minimizes the overall number of partitions. Further, a linear fit model may be applied to the partitions 1610. Additional functions and transformations may be applied prior to the linear fit depending on the application of the black-box model, such as the softmax or sigmoid function. The calculated linear models obtained from the partitions may be used to construct rules or some other logically equivalent representation 1612. The rules may be stored in any medium. For example, the rules may be stored as mathematical equations or may be represented using first order symbolic logic. Storing the rules as such may allow the extracted model to be applied to any known programming language and may be applied to any computational device. Finally, the rules may be applied to the white-box model 1614. The white-box model may store the rules of the black-box model, allowing it to mimic the function of the black-box model while simultaneously providing explanations that the black-box model may not have provided. Further, the extracted white-box model may parallel the original black-box model in performance, efficiency, and accuracy. The extracted white-box model W that is the result of conversion of the input predictor model U via the induction method, is an approximate or perfect bisimulation of U, i.e. W~U. The degree of bisimulation between the induced white-box model and the original predictor model is a parameter that can be set during steps 1608, 1610, 1612 and 1614. In terms of model and output interpretability, bisimulation is generally concerned with output interpretability in the case of the extracted model that is the end result of the induction method.

The partitioned data points may be filtered. A local model may be fitted to each partition. The local model may be linear. The data may also be transformed using a number of transformation functions, such as a polynomial expansion. A local model may be fitted to the transformed function or functions. Finally, the transformed and fitted functions may be interpreted by the model to form rules which can be presented in symbolic logic. The resulting set of rules may form a white-box AI model.

Figure 7:
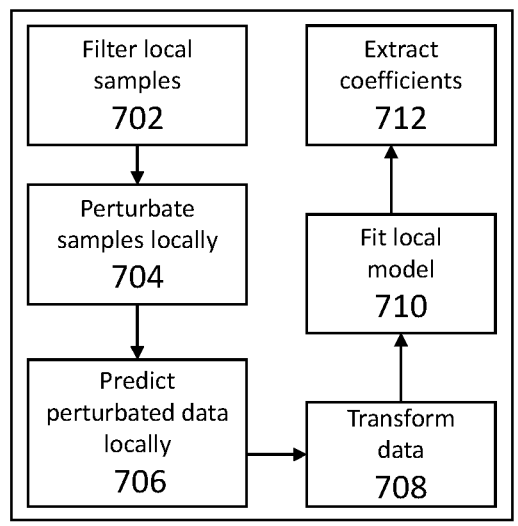
FIG. 7 is an exemplary embodiment of a schematic flowchart illustrating the induction method for one partition.

When adopting this approach, only the local fit function may need to be executed. FIG. 7 shows the process for applying part of the induction method on a specific partition to extract coefficients as part of the human assisted focused partitions. In mathematical terms, k may represent the number of newly generated human partitions. Next, the k partitions may be fit into a number of local partitions. This may be accomplished by first filtering local samples 702, then perturbating the samples locally, and combining the perturbated samples with the filtered local samples 704. Then, the model may predict perturbated data locally using the Predictor model 706. Additionally, the data may be transformed using one of a variety of transformation formulas 708. A local model may be fitted for each $j^{th}$ output 710, such that $Y_{Lj}=Fit(X_T)$. Coefficients may be extracted from the local model $Y_{Lj}$ 712. In a final exemplary step, the XAI model with k rules may be created using the local partitions and extracted coefficients.

Once the induction process identifies the coefficients for the human-generated partitions, a conversion process may be applied to convert the induced rules to an XNN. Conversion may be done to a sparse network should further training be applied, if retraining zero-valued coefficients is important. Alternatively, a dense structure may also be used which uses a fully connected approach for the coefficients in all rules. A summary of some possible conversion between the XAI rule-based model and XNN variants may be illustrated in FIG. 10.

In an exemplary embodiment, HKI processes may be used to add further information that may be used by the induction process to improve the overall quality of its results. For example, it is contemplated that HKI may be used to add information such as units and dimensions to the input features, which may be useful in determining the possible relationships between input features and allow for the automated identification of conversion functions. Continuing with the example, HKI may be used to identify that a particular feature is measured in inches while another feature is measured in meters and thus automatically determine that the two features may be compatible, as they both have a length dimension, and that a transformation function needs to be applied to make the explainable model produce meaningful explanations. Furthering the example, in an exemplary medical application, a feature that may be transformed to a dimension of mass may be combined with another that has a dimension of length to calculate specific ratios, such as a Body Mass Index (BMI), which may then be further combined with other features and feature combinations to achieve the desired values for use in a diagnostic and eventually for the production of an answer, explanation, and its justification.

An exemplary micro XNN 1006 may be converted into a sparse XNN 1004 or a dense XNN 1002 by simply combining 1012 the micro networks that make up the micro XNN 1006. Alternatively, a dense XNN 1002 or sparse XNN 1004 may be converted into a micro XNN by separating 1014 the conditional network 410 from the prediction network. Neurons in the prediction network may be further separated into individual micro networks as well, and the set of micro networks may jointly operate as a micro XNN 1006.

In an exemplary embodiment, a sparse XNN 1004 can be converted into a dense XNN 1002 simply by connecting 1016 every neuron in every layer of the prediction network, and by inserting coefficients which were previously unused or have 0 value. The reverse can be accomplished, and a dense XNN 1002 may be converted into a sparse XNN 1004 by disconnecting 1018 the unused neurons which have the coefficient 0.

The XNN conversion process can also convert an XNN back to an XAI model, including an exemplary rule-based XAI model. Since XNNs have a white-box architecture, the neurons, weights and connections can be directly mapped to a rule-based XAI model or a logical equivalent. Such a transformation from an XNN to an XAI model works by first extracting the partition conditions from the conditional network 410, and then extracting the coefficients 404 along with the input/transformed features 402. Such coefficients and features may be used to generate the linear or non-linear equations as defined by the general rule-based XAI model. The resulting XAI model will be a logical equivalent of the original XNN and can be reconverted back to an XNN and vice-versa without loss of information or functionality. Additionally, it is contemplated that an XAI model may incorporate features from multiple XNNs, with each being assigned its own section in the XAI model and having a fusion process that fuses information from each XNN into a combined XAI model. Such a combined XAI model may be reconverted back to a larger XNN if all the rules are compatible with encoding in a single conditional layer of the XNN, or a network of XNNs that are combined within one larger XNN.

Figure 8:
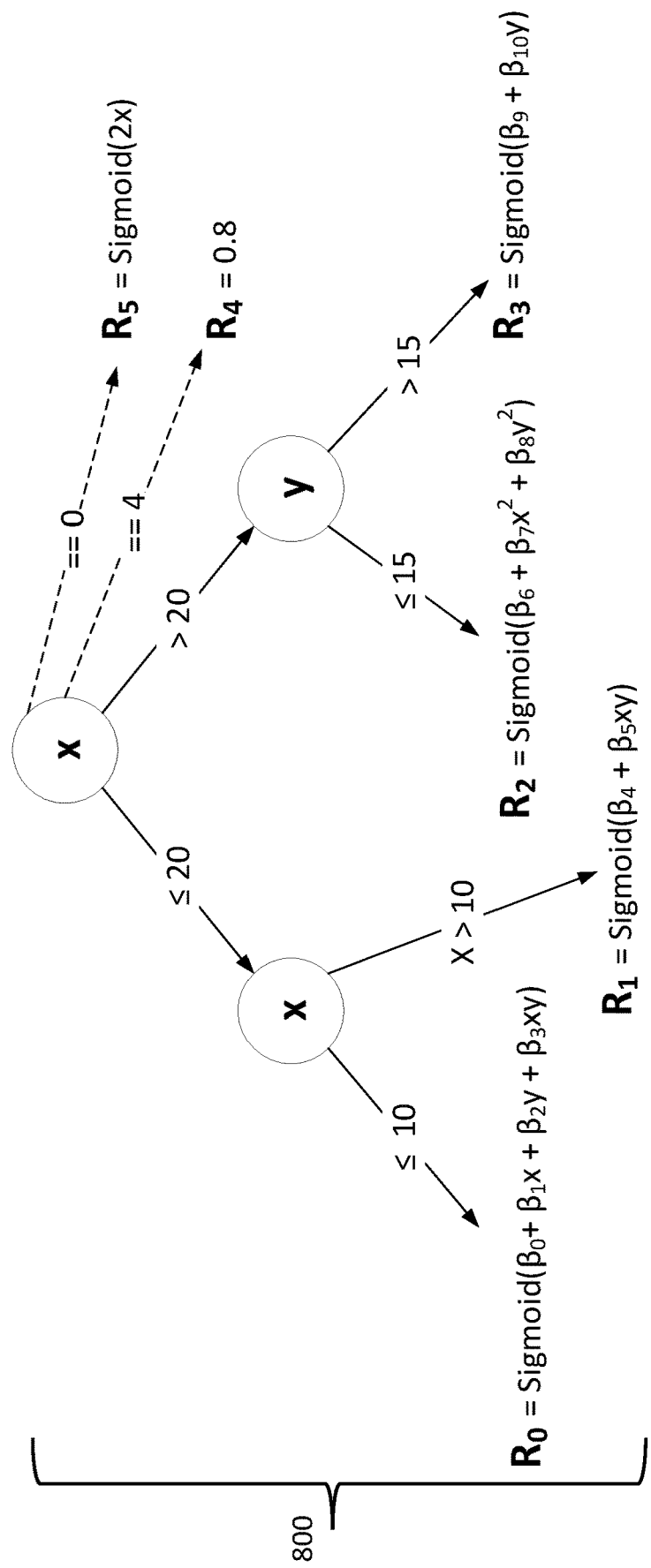
FIG. 8 is an exemplary embodiment of a schematic flowchart illustrating hierarchical rules with overlapping partitions.
Figure 9:
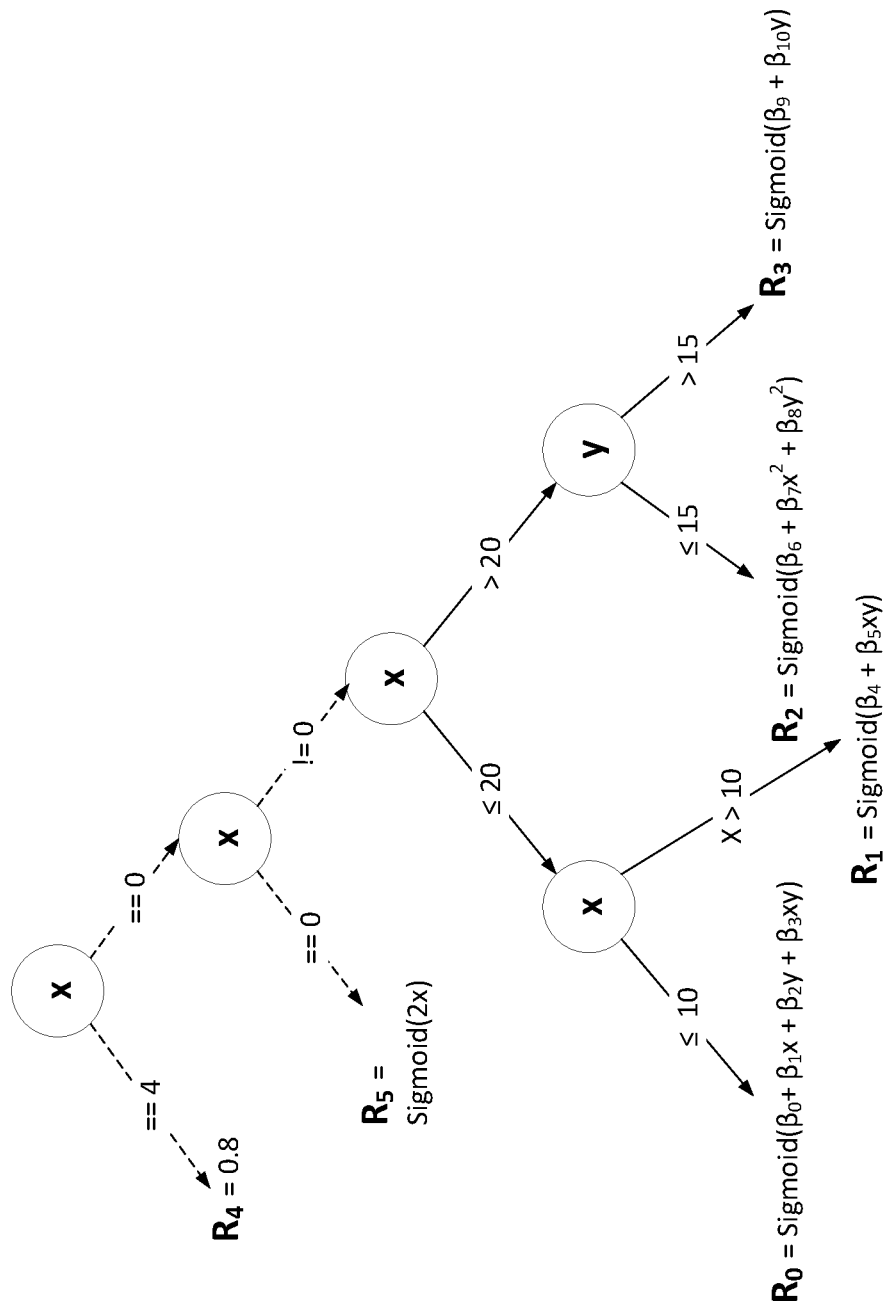
FIG. 9 is an exemplary embodiment of a schematic flowchart illustrating hierarchical rules with non-overlapping partitions.

Rules may have a hierarchical structure defined by the Localization Trigger. Newly defined human rules may create overlaps in the hierarchical structure. Referring to our exemplary ruleset which includes human-generated rules, FIG. 8 shows how rules can be represented using a hierarchical structure. The human-generated rules $R_4$ and $R_5$ overlaps with $R_0$. Overlaps in partitions may be solved either by using a priority function or an aggregation function that calculates a weighted result from all the triggered rules. An alternative method allows the newly generated rules to be refactored in such a way that the rules are non-overlapping. This requires adjusting the partitions which were previously created. Referring to FIG. 9, the hierarchy of rules which incorporates $R_4$ and $R_5$ may be illustrated in such that the entire ruleset does not have overlaps. As seen in the examples above, the hierarchical ruleset may also be represented as a flat system of equations. In embodiments where a priority vector and an adjusted priority vector is used, especially when there are overlapping partitions, the adjusted priority vector may have to be recalculated each time there is some form of human knowledge injection. With reference to FIG. 8 and FIG. 9, in an exemplary embodiment utilizing XNNs, it may be contemplated that the priority function may be implemented as a combination of the partition hierarchy structure itself and/or the ranking layer of an XNN. It is further contemplated that the selection layer of an XNN may be utilized to combine, aggregate and select appropriate partitions of the XNN as part of the ranking and output processes. Such an exemplary embodiment may provide a practical solution for the resolution of conflicts in an XAI system that incorporates human injected knowledge and/or external processes.

The main drivers for Human Knowledge Injection (HKI) include, but are not limited to weakness in the data, weakness in the rules, and bias detection.

An exemplary embodiment exploits the global nature of the XAI model and/or XNN to detect areas of strength and weakness in the underlying data training set, allowing interactive and directed feedback from the AI system to humans in the collection of future training data by identifying gaps and weaknesses that need to be addressed. The confidence level for each partition may be calculated in order to assess the weakness or strength in the data or rules. The confidence level may be determined by calculating the accuracy per rule (or other relevant metrics). For example, in an exemplary embodiment, it may be noted that the global accuracy of the model is 96%, however the accuracy of the individual rules or partitions is {98%, 98%, 96%, 92%} respectively, for rules $R_0$ to $R_3$ It may be noted that $R_3$ has lower accuracy when compared to the others and it needs further analysis and human intervention. This weakness analysis of the data training set itself allows for a directed approach towards the gathering of data that is more efficient than simply using a localized optimization search. AI systems using this method will be able to collaborate with humans in identifying areas for further data collection and sourcing, increasing the efficiency of the whole training process.

The globality of the XAI model and/or XNN enables the user to analyze for any potential bias. It may be analyzed by a human user, that the XAI model and/or XNN is biased towards a specific feature, or group of features. Such bias may be either in the training data or in the model itself. In order to circumvent the problem, human knowledge injection may be applied to enforce specific rules. For example, human rules and/or a combination of processes using workflows may be applied in order to ensure gender equality in a hiring system, ensuring that country-specific or jurisdiction-specific legislation is complied with. Bias detection may be determined through the coefficients of the rules or by aggregating the coefficients of specific explanations. In general, the higher the coefficient absolute values, the more important the feature is. Such feature importance helps determine where the bias is. Bias detection may also be determined for the partition conditions. For example, a specific partition may have a condition that applies only to "females", thus flagging up potential gender bias in the AI system.

In some cases, human intuition and the need to handle cases manually may be crucial for mission-critical applications. This may be necessary to handle exception cases, or cases when a very important decision needs to be taken. These exceptions are also necessary when human oversight, safety and ethical considerations need to be incorporated within an AI system, and in many cases incorporated in a manner that does not permit the AI system to change such behavior unless a human explicitly changes those exceptional cases.

Figure 11:
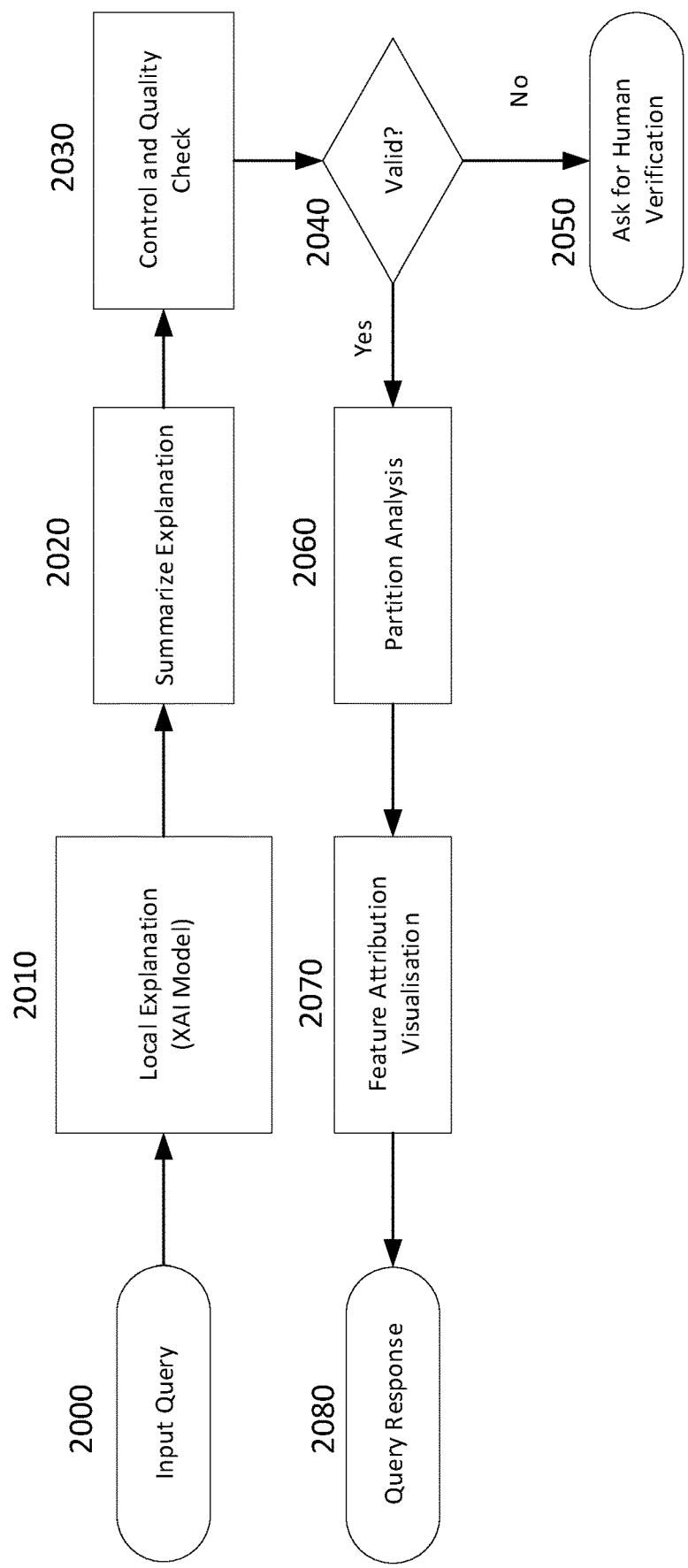
FIG. 11 is an exemplary workflow using an XAI Model and Human-Knowledge Injection for Control and Safety.

Human knowledge and business processes may be modelled as a workflow which enables the user to achieve full control over pre-hoc and post-hoc processing of the XAI Model. FIG. 11 shows an exemplary workflow which makes use of an XAI model and human knowledge injection. The use of human-knowledge injection in workflows may be used to enhance the generation of an explanation, to achieve control over the final action, incorporate safety in the decisions and actions of the model, trigger autonomous actions, ask for human input, and so on. Such workflows are expected to be configured by human users, which may be experts in the field, or knowledgeable in the domain where the workflow will be deployed.

A workflow serves as a pipeline to generate an explanation from the raw explanation data which may include but not limited to partition information, coefficients/weights, boundary conditions, rules, and so on. The raw data may be transformed into something which is closer to what the user can understand. A workflow may also take into consideration the goals and context of the user so as to personalize explanations and actions. A workflow may simply return an explanation and/or trigger actions for control, safety as well as human knowledge injection. In some cases, a workflow may be unable to complete autonomously, and it may pause the process to ask for human input. The conditions how and when to ask for user input are coded in the workflow itself and may adapt over time. A workflow may be used for detecting bias and to take actions based on the weakness or strength of the XAI model.

A workflow may include several nodes, notably input nodes, transform nodes, control nodes and output nodes. Exemplary input nodes may be input from a web server request, an event listener from a streaming data source, reading a file and the like. Transformation nodes may include the XAI Model itself, which generates the answer and explanation, data transforms on matrices, bias filters, explanation summarization, explanation refinement methods such as backmap, data filtering, and any other operations which may be programmed and configured by a human user. Exemplary output nodes may include sending back a web server response, triggering an event to a streaming data source, triggering an external action or notification, saving the results to a file, sending the results as a visualization output to a front-end system, ask for human input or verification, and so on. The workflow may also include control nodes, which branch several processes in parallel, control the process flow based on a set of conditions and in other cases merge the process flow from multiple operations. In an exemplary workflow used for XAI, some operation may utilize the XAI model in some form. In some embodiments, all the workflow or parts of it, may also be generated automatically by an automated system, and the human user acts a reviewer of the system. The workflow along with its XAI dependencies such as XAI Models, expert system rules, XNNs, XTTs may be embodied in both software and hardware. In some cases, a workflow may also be converted back to an explainable neural network, thus creating an end-to-end computational graph which may be trainable using gradient descent techniques. It is further contemplated that such conversion may be equivalent to incorporating workflows or processes within XAI models. According to the generalized rule format, the <Localization Trigger> represents the trigger of the XAI Model, and the action includes the combination of <Answer> and <Explanation>. When incorporating processes within XAI Models, the action becomes a <Process Definition>, thus having IF <Localization Trigger> Then <Process Definition>.

The process may make use of the <Answer> and <Explanation> data which are already part of the activated rule. The mix between processes, workflows, XAI models, XNN models, rules and the like are all possible since all components in the system are explainable and interpretable, thus enabling logically equivalent conversions. Human knowledge is useful in determining the right configuration for the system and to configure processes or workflows. It is further contemplated that a mix of various different explainable or interpretable models may be utilized, including, but not limited to, XAI models, INNs, XNNs, XTTs, XSNs, XMNs, XRLs, XGANs, XAEs, CNN-XNNs, PR-XNNs and other suitable models.

It may also be contemplated that human-input may also be received from multiple users. A collaboration process may be required when updating XAI models, XNN, rules, expert systems, workflows, or other explainable models such that a final decision is taken in an accountable manner. The process of choosing the outcome may involve a voting system. In an exemplary embodiment, when human knowledge injection is applied on the XAI Model, XNN or other explainable model directly, the voting system may be used to adjust the weights in a manner that it takes the feedback from all users. In an alternative embodiment, human votes may also be used to identify suitable partitions or when applying human assisted focusing, in other words when human users define the partitions without actually specifying any details on the underlying local models. Votes may be transformed using an appropriate transformation function. Votes may also be processed and/or weighted using suitable methods such as the Cohen Kappa, Fleiss Kappa, or Krippendorff Alpha statistic to facilitate practical implementation and uniform fusion of results from multiple users. The white-box nature of XAI Models, XNNs, and other explainable models allows such human knowledge to be preserved even when further training is applied, and new connections and weights are found through an automated system. Alternatively, the system may also be configured such that the human input only serves as initialization, and the automated system will simply refine the XAI model, XNN, and other explainable models from the human-specific starting point.

It may be further contemplated that rules which had been created through human-knowledge injection may also incorporate a monitoring system to mitigate any potential impact which may be caused by unexpected behavior. In the event that human defined rules cause instability to the system, change in model performance, introduction of bias, or some other unexpected behavior, the rule or a component of the XAI model, XNN or other explainable model may be flagged for further inspection by a human user and an alert may be triggered to control the system in an appropriate manner. The XAI model, XNN or other explainable system may be configured to disable such rule or component. Alternatively, the XAI model, XNN, or other explainable system may also be configured to adapt the behavior of the model in a suitable manner. Such change in behavior may be done in an automated manner, or via fail-safe exceptions configured by human user.

In an exemplary embodiment, behavior arising from HKI processes is seamlessly blended together with AI created and learnt behavior as part of a common behavioral model (BM) or behavioral model hierarchy (BMH) that has constraints and conditions based on rules, workflow nodes or their logical equivalent. The BMs can thus react to these conditions and give rise to events, triggers and actions based on a combination of machine and human instructions. This blending provides a practical solution towards allowing machine learning and AI to learn in an unsupervised manner, while being controlled explicitly by humans.

Referring now to the exemplary HKI embodiment illustrated in FIG. 5, a particular rule may be introduced via HKI, such as previously given:
Rule 4 (Human-Generated)
If x==4 Then
    $Y_4=0.8$
Such a rule may then be referenced in a behavioral model (BM) or a behavioral model hierarchy (BMH). An exemplary BM condition in this case would generate an event when, for example, the value of $Y_4$ exceeds 0.7 and another event when it becomes greater or equal to 0.8. These events can then further trigger a chain of events and actions, for example, a caution action when the value of $Y_4$ exceeds 0.7 and execute some form of protective automated action when the value of $Y_4$ becomes equal or exceeds 0.8.

HKI methods may provide the ability for human users to internally link one explainable model to one or more explainable models. For example, a rule that refers to one or more explainable models outside the current model containing that rule may execute a part or whole of another model when its trigger condition is true. A model reference or model name may be used in such cases to correctly identify the specific model or models to be linked. The model reference or model name may include either a canonical reference or a relative reference that is parsed with respect to an environment or workspace to correctly implement the explainable model call. Referenced models may be hosted in the same device as the calling model, or may be hosted on a separate external device that is connected directly or via a suitable telecommunications network. It is further contemplated that the referenced model may be implemented in a distributed fashion or hosted on a cloud computing environment. When all referenced explainable models from the calling model are white-box explainable models themselves, the resulting end-to-end multi-model system is also a white-box explainable system itself.

Explainable systems and HKI methods may produce audit log information that is enhanced by the Explanations and/or Justifications produced by explainable models. An exemplary application of such audit log information is in the creation of trace paths that clearly illustrate the flow, interactions and behavior of the explainable system to come up with the Answer and its accompanying Explanation. It is contemplated that trace paths may be implemented in expert systems and rule-based systems as an annotated sequence of rules that have been triggered and executed. It is further contemplated that trace paths may be implemented in workflow systems as an annotated sequence of workflow nodes and paths that have been executed by the workflow engine. The trace path can be used to illustrate just the precise sequence and behavior of the explainable system or may be implemented and configured to display nearest neighbors along the path that may be of interest to the user.

In an exemplary embodiment, an explainable system that has been modified using HKI techniques and methods creates and transmits a tamper-proof record to an independent System of Record. A practical implementation of such a system may utilize a combination of Distributed Ledger Technology (DLT), a private blockchain, a public blockchain, secure audit database, secure audit log system, a TPM module, hardware secure module (HSM), smartcard module, SIM card, or a suitably tamper-proof implementation device. Cryptographic and encryption methods may be applied to enhance the security of such an implementation. Hashing and checksum methods may also be applied to enhance the security of such an implementation. It is further contemplated that such an explainable system with a tamper-proof System of Record may be implemented in a manner that is compliant with relevant country-specific, industry-specific or international standards, such as FIPS 140, FIPS 140-2, FIPS 140-3, IEEE P1363, IEEE P1619, ISO 19092, ISO/IEC 18014, PCKS, EIDAS, ESSIF and other relevant standards.

In an exemplary embodiment, XAI, XNNs, rule-based models, workflows and logically equivalent explainable models may allow for selective deletion of particular logical rules or selective deletion of specific components from an XAI, XNN, rule-based model, workflow or other explainable model. In an exemplary application, customer records may have to be deleted due to data protection issues and the right to be forgotten (GDPR). The white-box nature of explainable models may easily identify which partitions, components or connections could potentially be impacted by a removing a specific data point. Analysis may be performed such that the impact is examined locally (on a specific partition) as well as globally (on the entire explainable model). The analysis may incorporate frequency analysis of a specific path trace along partitions, connections and features in order to identify the rarity or commonality of such data point. The trace path analysis may be in the form of a backmap process whereby the output of the neural network is projected back to the input in order to analyze and perform an impact assessment of the partition, feature importance, and data in the explainable model and data via HKI processes, against a number of criteria and thresholds and values set against those criteria. If the impact assessment concludes that such data points will result into different model behavior, various mitigation strategies may be applied. The first strategy may involve updating of weights to minimize or take out a path without the need for re-training. A second strategy may involve updating weights along the connection to minimize or reduce the effect of the data point without needing re-training. A third strategy may involve using Fast XAI extensions to achieve the two other strategies in real-time by updating the explainable model in real-time without need for re-training. A fourth strategy may also involve re-training parts of the model using a modified version of the original dataset which now excludes the selected data points. Unlike black-box models, XAI/XNN models may eliminate the need to retrain the entire model from scratch, which in some cases may not be practically possible. Other impact assessment strategies may be implemented according to the specific embodiment and application considering domain specific processes and knowledge as may be applicable. The trace path itself may have trace path frequency information calculated for it as a weighted combination of the frequencies of the components lying on that particular trace path. The rarity or conversely, commonality, of that trace path respectively determines the identifiability or conversely, anonymity, of a particular data point. The trace path frequency and impact assessment may be combined in assessing the extent to which the explanation and the justification may need to be modified to accommodate the process of selective editing and deletion. The justification may include an explicit marker that HKI processes were involved in the creation of such modified answers. The process of selective deletion may allow neural networks and ML models to comply with privacy laws, right to be forgotten laws, and allow assertion of ownership rights over training data sets to take place effectively and in line with best practices in Europe, USA and the rest of the world.

In an exemplary application, an XAI or XNN model may be able to detect and explain abnormal patterns of data packets within a telecoms network and take appropriate action, such as allowing a user to remain connected, discard part of the data packets or modifying the routing priority of the network to enable faster or slower transmission. An XAI system may be able to extract the necessary rules such that it is able to handle most of the cases accurately. However, it may be noted by a human user, that specific exceptions may need to be coded in the ruleset in order to handle exceptions. In this specific situation, human knowledge injection may be necessary to boost the model performance and explainability.

In an exemplary embodiment, an explainable system that may utilize a BM or BMH is implemented together with a Robotic Process Automation (RPA) system, where the BM or BMH raises events, triggers and actions arising from the explainable system that in turn make the RPA system perform some particular action. The RPA system may also implement its own direct link to the explainable system, in a similar manner to how a BM or BMH may be linked to an explainable system. HKI methods may be used to add, edit or delete the necessary linking processes within the explainable system to enable it to interface correctly with an RPA system. HKI methods may also be used to add, edit or delete rules and/or workflow nodes to enable the explainable system to interface or be integrated with an RPA system correctly.

In some cases, the user may know the exact answer, but in other cases, the human user is only capable of instructing the XAI system where to look for or where not to look for. In the former situation, rules may be exported to an expert system to code the exception handling. In the latter approach, the user may define a partition which needs special attention. The newly defined partition may be used to assist in focusing the model.

In an exemplary embodiment, an explanation of why such action is required is generated with a white-box model, while a black-box would simply recommend the action without any explanation. It would be both useful for the telecoms operator and the customer to understand why the model came to a conclusion. With a white-box model, one can understand which conditions and features lead to the result. Both parties have different goals. From one side, the telecoms operator is interested in minimizing security risk and maximizing network utilization, whereas the customer is interested in uptime and reliability. In one case, a customer may be disconnected on the basis that the current data access pattern is suspicious, and the customer has to close off or remove the application generating such suspicious data patterns before being allowed to reconnect. This explanation helps the customer understand how to rectify their setup to comply for the telecom operator service and helps the telecom operator from losing the customer outright, yet still minimizing the risk. The telecom operator may also benefit from this explanation. The operator may observe that the customer was rejected because of repeated breaches caused by a specific application, which may indicate that there is a high likelihood that the customer may represent an unacceptable security risk within the current parameters of the security policy applied. Further, a third party may also benefit from the explanation: the creator of the telecom security model. The creator of the model may observe that the model is biased such that it over-prioritizes the fast reconnect count variable over other, more important variables, and may alter the model to account for the bias.

The system may consider a variety of factors. Exemplary factors may include a number of connections in the last hour, bandwidth consumed for both upload and download, connection speed, connect and re-connect count, access point information, access point statistics, operating system information, device information, location information, number of concurrent applications, application usage information, access patterns in the last day, week or month, billing information, and so forth. The factors may each weigh differently, according to the telecom network model.

The resulting answer may be obtained after the model detects abnormality and decides whether a specific connection should be approved or denied. In this exemplary case, an equation indicating the probability of connection approval is returned to the user. The coefficients of the equation may determine which features impact the probability.

In an exemplary embodiment, an explainable system is implemented in an Augmented Reality (AR) device that utilizes real-time sensory input from the user to assist the user in performing a particular task at hand, together with explanations. For example, if a user is assembling a piece of furniture using an AR assisted smartphone or AR assisted smart glasses, the explainable system may take advantage of the inherent process-oriented flow within the workflow and may utilize HKI methods when used by a trainer or professional to correct and tweak parts of the process that can be optimized or presented better to the user. HKI methods may also be used to annotate and enrich a machine learnt sequence constituting a part or whole of steps in a task, including but not limited to adding human friendly labels and information, annotating specific tags with respect to a taxonomy or ontology, and adding regulatory and safety related markers to particular steps or sub-steps in a task sequence. HKI methods may be used by the non-professional end user to give feedback about parts of the task assistance process that may be confusing or ambiguous, enabling a continuous review and improvement cycle to be implemented.

A partition may be a cluster that groups data points optionally according to some rule and/or distance similarity function. Each partition may represent a concept or distinctive category of data. Partitions that are represented by exactly one rule may have a linear model which outputs the value of the prediction or classification. Since the model is linear, the coefficients of the linear model can be used to score the features by their importance. The underlying features may represent a combination of linear and non-linear fits as the rule format handles both linear and non-linear equations.

For example, the following are partitions which may be defined in the telecom network model example:

IF Upload_Bandwidth>10000 AND Reconnect_Count <=3000 AND Operating_System="Windows" THEN Connection_Approval= . . .
IF Upload_Bandwidth>10000 AND Reconnect_Count> 3000 THEN Connection_Approval= . . .
IF Banwidth_In_The_Last_10_Minutes>=500000 THEN Connection_Approval= . . .
IF Device_Status="Idle" AND Concurrent_Applications <10 THEN Connection_Approval= . . . Etc The following is an example of the linear model which is used to predict the Approval probability.
Connection_Approval=Sigmoid ($\theta_1+\theta_2$ Upload_Bandwidth+$\theta_3$Reconnect_Count+$\theta_4$Concurrent_Applications+ . . . ).

The coefficients $\theta_i$ represent the importance of each feature in determining the final output, where i represents the feature index. The Sigmoid function is used in this example because it is a binary classification scenario. Another rule may incorporate non-linear transformations such as polynomial expansion, for example $\theta_i$Concurrent_Applications$^2$ may be one of the features in the rule equation.

Following the initial creation of the XAI model, a scenario may arise where the first rule in the exemplary model is biased towards a specific operating system. In an exemplary application, such bias is not allowed and should be removed. Human knowledge injection may be applied to adjust the partition in such a way that the condition for the operating system is removed.

In another exemplary scenario, the human user may be aware that traffic coming from a specific location needs special attention; however, the rule to cater for this segment is not known. In this case, the user defines a new partition, and through assisted focusing, a local model is learnt automatically. The XAI Model and XNN may be updated accordingly through the necessary conversions.

In another embodiment, the XAI model may be embedded in a workflow which may be user defined, configured, or reviewed by human users. FIG. 11 shows an exemplary workflow whereby the input starts through some query 2000. Referring to the foregoing telecom example, the input may receive details about the specific request with data fields such as bandwidth, reconnect count, concurrent applications, and so on. The input may have additional pre-hoc transformations; however, in this example the input 2000 goes straight to the XAI model 2010 which generates an answer along with a localized explanation. The explanation may contain data about many features, but might focus on the most important features so that the explanation may be simplified as shown in step 2020. The process 2020 may also involve simplifying the interpretation of transformed features such as polynomial features. A control and quality check 2030 may be applied such that the level of importance attributed to the final result is allocated in a manner which is fair and which does not cause unnecessary bias. The result of the control and quality check may be validated through the control node 2040, which determines if an exception should be triggered, and which then may seek human verification 2050 based on a result of said determination. In an exemplary embodiment, the control and quality check 2030 may entail applying one or more rules or conditions, and determining the validity of the feature attribution generated from the XAI/XNN model based on the satisfaction (or lack thereof) of said rules or conditions. (It may be contemplated for the one or more rules or conditions to be externally derived rules or conditions, such as rules or conditions which have been derived from legal conditions, institutional policy, and so forth, but further rules and conditions may also be contemplated, such as rules and conditions derived from interpretation of human verification 2050.) In an exemplary case, the user of the workflow may want to ensure that the feature attribution is allocated in an appropriate manner and that the output is not biased towards a specific feature. For instance, in a telecom example, the user of the workflow may want to check that the gender field is not impacting the actual result, and, accordingly, the control and quality check 2030 may entail applying a rule or condition that the gender field should not impact the actual result. In an exemplary embodiment, the control and quality check 2030 may output a binary field such which flags if it is valid or not, or a quantitative value which determines the validity of the result, based on a determination of whether this rule or condition is satisfied. The control node 2040 may then operate to determine whether an exception should be triggered based on this binary or quantitative result; for example, the control node 2040 may be configured to determine that an exception should be triggered if the result is determined to be valid, or if the quantitative value is above or below a certain score. The local explanation 2010 may generate a vector of feature attributions, whereby each element in the vector represents the importance or attribution of a specific feature. In an exemplary control check, a workflow node may verify that the gender is not accounting for more than 5% of the final result. Additionally, what-if and what-if-not scenarios may be applied to compare the answer and explanations when the gender is different. The node may check and compare the answer and explanation for both males and females. Humans may apply certain thresholds to allow for flexibility in the control and safety checks. In an exemplary embodiment, the system may be configured such that a difference of no more than 5% is allowed. The control check may also determine that a different explanation was provided for males and females, yet the final answer was still the same. In an exemplary embodiment, the occupation field may be given more importance when the gender is male, yet the final answer may be equal to those that have a female gender.

Alternatively, the workflow may proceed normally and generate analysis of the partitions which had been triggered as shown in step 2060, along with visualization of the summarized feature attributions 2070. The final analysis and visualizations are then sent to a user interface or other output via the output node 2080.

The white-box nature of the XAI models and XNNs enables a wide-variety of applications where human-knowledge injection is vital for improving the adoption of AI applications in areas where explanations are vital for the decision-making process. An exemplary embodiment allows for humans and machines to collaborate effectively within a two-way feedback process that helps improve performance faster than otherwise possible with the one-way feedback process that is the only mode available when using black-box systems.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for injecting knowledge into an explainable model, comprising:
   identifying a plurality of partitions, wherein each partition comprises a local model, and wherein the plurality of partitions form a global model, wherein the global model is linear or non-linear;
   forming a set of rules based on one or more local models;
   representing the set of rules in a symbolic logic format;
   forming an explainable model with the set of rules and the one or more local models;
   receiving, from a user, a set of data corresponding to human knowledge;
   representing the set of data in the symbolic logic format, said representation comprising a localization trigger and an action;
   creating a condition based on the localization trigger, wherein the explainable model is configured to execute the action upon detection of the condition.

2. The method of claim 1, wherein a step of representing the set of data in the symbolic logic format is performed without incorporating training data into the set of data and without performing re-training of the explainable model.

3. The method of claim 1, wherein the explainable model is one or more of an explainable neural network (XNN), an interpretable neural network (INN), an explainable artificial intelligence (XAI), an explainable convolutional neural network (XNN-CNN), an explainable generative adversarial network (XGAN), an explainable transducer transformer (XTT), an explainable spiking net (XSN), an explainable memory net (XMN), an explainable reinforcement learning (XRL) system, an explainable autoencoder (XAE), a dense neural network, a sparse neural network, a micro neural network, an expert system, and an explainable predictive network (PR-XNN).

4. The method of claim 1, further comprising converting the set of rules into a workflow comprising one or more computational graphs.

5. The method of claim 1, wherein the human knowledge comprises a privacy law.

6. The method of claim 1, wherein the set of data corresponding to human knowledge is applied to a specific partition.

7. The method of claim 1, further comprising identifying a weak partition from the plurality of partitions, and creating at least one further rule based on the weak partition.

8. The method of claim 1, wherein a further rule is based on a safety feature, and wherein the further rule is unchangeable by the model.

9. The method of claim 1, wherein the explainable model is embedded in a user-defined workflow.

10. The method of claim 9, further comprising:
    receiving an input related to the human knowledge;
    inputting the input to the explainable model and receiving an output from the explainable model;
    receiving a localized explanation from the explainable model;
    summarizing the localized explanation and identifying relevant feature attributions;
    performing a control and quality check;
    validating, by a control node, the result of the control and quality check and determining if an exception should be triggered;

generating an analysis of the partitions;
generating a visualization of the summarized explanations and relevant feature attributions;
outputting the analysis of the partitions, visualization of the summarized explanations, and relevant feature attributions.

11. The method of claim 10, further comprising:
verifying, via a user input, the localized explanation and feature attributions.

12. The method of claim 10, further comprising:
performing pre-hoc processing on the input related to the human knowledge prior to inputting the input into the explainable model, said pre-hoc processing step further comprising preventing further processing until input is provided from a human user; and
performing post-hoc processing at a step after a step of receiving the localized explanation from the explainable model, said post-hoc processing step further comprising preventing further processing until input is provided from the human user.

13. The method of claim 1, further comprising defining a further partition based on the condition and fitting a further local model to the further partition.

14. The method of claim 13, wherein a step of fitting the further local model to the new partition is performed by the explainable model.

15. The method of claim 1, further comprising
training the explainable model using a gradient descent method, wherein the at least one partition is unchangeable by the gradient descent method.

16. The method of claim 1, wherein the condition is selected based on input from a plurality of users.

17. The method of claim 16, wherein the condition is selected based on a vote from the plurality of users, and further comprising adjusting, based on the vote, at least one of: at least one feature attribution, at least one model weight, and at least one model coefficient.

18. The method of claim 16, further comprising identifying one or more relevant partitions based on the vote, and inserting the condition based on the relevant partition or partitions.

19. The method of claim 1, further comprising organizing the set of rules into a plurality of groups of rules, wherein rules in a group of rules are organized hierarchically.

20. The method of claim 19, further comprising aggregating the rules in one of the plurality of groups of rules.

21. The method of claim 19, further comprising converting one of the plurality of groups of rules into one of an explainable neural network, an explainable artificial intelligence, an expert system, and a workflow.

22. The method of claim 1, further comprising assigning a priority to each rule in the set of rules.

23. The method of claim 1, further comprising performing a combined operation on one or more rules, said combined operation comprising performing at least one of: selecting, merging, splitting or aggregating the one or more rules.

24. The method of claim 1, further comprising converting the explainable model into one of an explainable neural network, an explainable artificial intelligence, an expert system, a workflow, and a system of rules.

25. The method of claim 24, wherein the explainable model is converted into a workflow, and further comprising presenting the workflow to a human user, receiving user input relating to the rules in the workflow, and updating the workflow based on the user input.

26. The method of claim 25, wherein the workflow is updated to provide an explanation based on one or more of partition information, weights, boundary conditions, rules, and feature attributions.

27. The method of claim 25, further comprising receiving at least one of a user goal and a user context and personalizing an explanation and the action based on the user goal and/or user context.

28. The method of claim 25, further comprising converting the workflow to an explainable neural network, wherein the converted explainable neural network forms an end-to-end computational graph, and wherein the end-to-end computational graph is trainable via gradient descent techniques.

29. The method of claim 1, wherein the explainable model is further configured to interface with or be integrated with a further system, said further system comprising a Robotic Process Automation system; and
further comprising outputting the action to the Robotic Process Automation system.

* * * * *